US007357312B2

(12) United States Patent
Gangi

(10) Patent No.: US 7,357,312 B2
(45) Date of Patent: *Apr. 15, 2008

(54) SYSTEM FOR ASSOCIATING IDENTIFICATION AND PERSONAL DATA FOR MULTIPLE MAGNETIC STRIPE CARDS OR OTHER SOURCES TO FACILITATE A TRANSACTION AND RELATED METHODS

(76) Inventor: Frank J. Gangi, 18 Windsor Ridge, Frisco, TX (US) 75034

(*) Notice: Subject to any disclaimer, the term of this patent is extended or adjusted under 35 U.S.C. 154(b) by 125 days.

This patent is subject to a terminal disclaimer.

(21) Appl. No.: 11/394,314

(22) Filed: Mar. 30, 2006

(65) Prior Publication Data

US 2006/0169768 A1 Aug. 3, 2006

Related U.S. Application Data

(63) Continuation-in-part of application No. 11/130,765, filed on May 17, 2005, now Pat. No. 7,083,087, which is a continuation of application No. 10/052,405, filed on Jan. 17, 2002, now Pat. No. 6,938,821, which is a continuation-in-part of application No. 09/664,205, filed on Sep. 18, 2000, now Pat. No. 6,402,029, which is a continuation-in-part of application No. 09/618,407, filed on Jul. 18, 2000, now Pat. No. 6,293,462, which is a continuation of application No. 09/087,193, filed on May 29, 1998, now Pat. No. 6,131,811.

(51) Int. Cl.
*G06K 5/00* (2006.01)
(52) U.S. Cl. ............... 235/380; 235/375; 235/379; 235/381; 235/383
(58) Field of Classification Search ........... 235/380, 235/492, 381, 383, 379; 705/70–75
See application file for complete search history.

(56) References Cited

U.S. PATENT DOCUMENTS 3,845,277 A 10/1974 Voss et al.
(Continued)

FOREIGN PATENT DOCUMENTS

AU 732877 B2 10/1998
(Continued)

OTHER PUBLICATIONS

Towitoko Electronics, "Product Overview Smartcard Terminals & Systems", Feb. 1998.
(Continued)

*Primary Examiner*—Michael G. Lee
*Assistant Examiner*—Kristy A. Haupt
(74) *Attorney, Agent, or Firm*—Bracewell & Giuliani LLP

(57) ABSTRACT

A system to provide a customized set of identification data to facilitate a transaction and related methods are provided. The system includes a server configured to store personal control IDs and sets of personal data and configured to store a data profile derived from a set of personal data associated with a personal control ID identifying a selected different person for use by a selected one of one or more providers identified by a provider ID. The system also includes a data processor remote from and in communication with the server and a point of transaction terminal adapted to couple to an ID instrument to receive a personal control ID identifying a selected different person and to send the personal control ID to the data processor to transmit with a provider ID to the server. The server is further configured to retrieve a data profile derived from the set of personal data associated with the personal control ID and to transmit the data profile for use by the selected provider identified by the provider ID. The system can also include an output device to receive the data profile and to output the data profile to the selected provider to thereby verify the personal control ID as being associated with a user of the personal control ID at the point of transaction prior to proceeding with a transaction.

41 Claims, 8 Drawing Sheets

U.S. PATENT DOCUMENTS

| | | |
|---|---|---|
| 4,016,405 A | 4/1977 | McCune et al. |
| 4,102,493 A | 7/1978 | Moreno |
| 4,214,230 A | 7/1980 | Fak et al. |
| 4,234,932 A | 11/1980 | Gorgens |
| 4,253,017 A | 2/1981 | Whitehead |
| 4,314,352 A | 2/1982 | Foght |
| 4,390,968 A | 6/1983 | Hennessy et al. |
| 4,437,130 A | 3/1984 | Hennessy et al. |
| 4,438,326 A | 3/1984 | Uchida |
| 4,443,027 A | 4/1984 | McNeely et al. |
| 4,458,142 A | 7/1984 | Bernstein |
| 4,614,861 A | 9/1986 | Pavlov et al. |
| 4,634,845 A | 1/1987 | Hale et al. |
| 4,650,978 A | 3/1987 | Hudson et al. |
| 4,679,236 A | 7/1987 | Davies |
| 4,701,601 A | 10/1987 | Francini et al. |
| 4,705,211 A | 11/1987 | Honda et al. |
| 4,707,594 A | 11/1987 | Roth |
| 4,742,351 A | 5/1988 | Suzuki |
| 4,755,940 A | 7/1988 | Brachtl et al. |
| 4,772,782 A | 9/1988 | Nonat |
| 4,791,283 A | 12/1988 | Burkhardt |
| 4,837,422 A | 6/1989 | Dethloff et al. |
| 4,837,822 A | 6/1989 | Crosley et al. |
| 4,849,613 A | 7/1989 | Eisele |
| 4,868,376 A | 9/1989 | Lessin et al. |
| 4,918,631 A | 4/1990 | Hara et al. |
| 4,926,480 A | 5/1990 | Chaum |
| 4,928,001 A | 5/1990 | Masada |
| 4,959,788 A | 9/1990 | Nagata et al. |
| 4,960,982 A | 10/1990 | Takahira |
| 4,990,759 A | 2/1991 | Gloton et al. |
| 5,095,196 A | 3/1992 | Miyata |
| 5,130,519 A | 7/1992 | Bush et al. |
| 5,135,095 A | 8/1992 | Kocznar et al. |
| 5,168,520 A | 12/1992 | Weiss |
| 5,192,947 A | 3/1993 | Neustein |
| 5,220,501 A | 6/1993 | Lawlor et al. |
| 5,221,838 A | 6/1993 | Gutman et al. |
| 5,276,311 A | 1/1994 | Hennige |
| 5,317,636 A | 5/1994 | Vizcaino |
| 5,371,797 A | 12/1994 | Bocinsky, Jr. |
| 5,373,558 A | 12/1994 | Chaum |
| 5,375,037 A | 12/1994 | Le Roux |
| 5,412,192 A | 5/1995 | Hoss |
| 5,426,283 A | 6/1995 | Berthozat et al. |
| 5,434,398 A | 7/1995 | Goldberg |
| 5,434,919 A | 7/1995 | Chaum |
| 5,438,186 A | 8/1995 | Nair et al. |
| 5,440,108 A | 8/1995 | Tran et al. |
| 5,444,616 A | 8/1995 | Nair et al. |
| 5,448,047 A | 9/1995 | Nair et al. |
| 5,455,407 A | 10/1995 | Rosen |
| 5,471,045 A | 11/1995 | Geronimi |
| 5,473,690 A | 12/1995 | Grimonprez et al. |
| 5,497,411 A | 3/1996 | Pellerin |
| 5,538,442 A | 7/1996 | Okada |
| 5,557,518 A | 9/1996 | Rosen |
| 5,568,121 A | 10/1996 | Lamensdorf |
| 5,578,808 A * | 11/1996 | Taylor ........................ 235/380 |
| 5,585,787 A | 12/1996 | Wallerstein |
| 5,590,038 A | 12/1996 | Pitroda |
| 5,590,197 A | 12/1996 | Chen et al. |
| 5,623,552 A | 4/1997 | Lane |
| 5,627,355 A | 5/1997 | Rahman et al. |
| 5,649,118 A | 7/1997 | Carlisle et al. |
| 5,655,008 A | 8/1997 | Futch et al. |
| 5,671,280 A | 9/1997 | Rosen |
| 5,689,247 A | 11/1997 | Welner |
| 5,745,555 A | 4/1998 | Mark |
| 5,754,652 A | 5/1998 | Wilfong |
| 5,754,653 A | 5/1998 | Canfield |
| 5,754,656 A | 5/1998 | Nishioka et al. |
| 5,761,309 A | 6/1998 | Ohashi et al. |
| 5,790,677 A | 8/1998 | Fox et al. |
| 5,818,030 A | 10/1998 | Reyes |
| 5,825,871 A | 10/1998 | Mark |
| 5,831,862 A | 11/1998 | Hetrick et al. |
| 5,834,747 A | 11/1998 | Cooper |
| 5,834,756 A | 11/1998 | Gutman et al. |
| 5,844,497 A | 12/1998 | Gray |
| 5,850,442 A | 12/1998 | Muftic |
| 5,883,810 A | 3/1999 | Franklin et al. |
| 5,884,271 A | 3/1999 | Pitroda |
| 5,895,903 A | 4/1999 | Abe et al. |
| 5,905,246 A | 5/1999 | Fajkowski |
| 5,913,203 A | 6/1999 | Wong et al. |
| 5,915,226 A | 6/1999 | Martineau |
| 5,917,168 A | 6/1999 | Nakamura et al. |
| 5,936,226 A | 8/1999 | Aucsmith |
| 5,936,541 A | 8/1999 | Stambler |
| 5,937,394 A | 8/1999 | Wong et al. |
| 5,940,511 A | 8/1999 | Wilfong |
| 5,953,710 A | 9/1999 | Fleming |
| 5,955,961 A | 9/1999 | Wallerstein |
| 5,956,699 A | 9/1999 | Wong et al. |
| RE36,365 E | 11/1999 | Levine et al. |
| 5,991,412 A | 11/1999 | Wissenburgh et al. |
| 6,000,832 A | 12/1999 | Franklin et al. |
| 6,003,763 A | 12/1999 | Gallagher et al. |
| 6,012,634 A | 1/2000 | Brogan et al. |
| 6,012,636 A | 1/2000 | Smith |
| 6,018,717 A | 1/2000 | Lee et al. |
| 6,024,288 A | 2/2000 | Gottlich et al. |
| 6,029,150 A | 2/2000 | Kravitz |
| 6,029,890 A | 2/2000 | Austin |
| 6,032,134 A | 2/2000 | Weissman |
| 6,038,492 A | 3/2000 | Nichols et al. |
| 6,047,268 A | 4/2000 | Bartoli et al. |
| 6,050,493 A | 4/2000 | Fertig |
| 6,068,184 A | 5/2000 | Barnett |
| 6,068,192 A | 5/2000 | McCabe et al. |
| 6,072,870 A | 6/2000 | Nguyen et al. |
| 6,075,861 A | 6/2000 | Miller, II |
| 6,078,888 A | 6/2000 | Johnson, Jr. |
| 6,078,902 A | 6/2000 | Schenkler |
| 6,089,451 A | 7/2000 | Krause |
| 6,098,053 A | 8/2000 | Slater |
| 6,101,477 A | 8/2000 | Hohle et al. |
| 6,111,953 A | 8/2000 | Walker et al. |
| 6,122,625 A | 9/2000 | Rosen |
| 6,131,811 A | 10/2000 | Gangi |
| 6,132,799 A | 10/2000 | Cornigllon et al. |
| 6,163,771 A | 12/2000 | Walker et al. |
| D436,620 S | 1/2001 | Webb et al. |
| 6,188,309 B1 | 2/2001 | Levine |
| 6,189,787 B1 | 2/2001 | Dorf |
| 6,205,436 B1 | 3/2001 | Rosen |
| 6,206,293 B1 | 3/2001 | Gutman et al. |
| RE37,122 E | 4/2001 | Levine et al. |
| 6,213,403 B1 | 4/2001 | Bates, III |
| 6,215,665 B1 | 4/2001 | Martin |
| 6,224,109 B1 | 5/2001 | Yang |
| 6,227,447 B1 | 5/2001 | Campisano |
| 6,230,977 B1 | 5/2001 | Johnson |
| 6,257,486 B1 | 7/2001 | Teicher et al. |
| 6,293,462 B1 | 9/2001 | Gangi |
| 6,327,578 B1 | 12/2001 | Linehan |
| 6,332,134 B1 | 12/2001 | Foster |
| 6,339,766 B1 | 1/2002 | Gephart |
| 6,343,284 B1 | 1/2002 | Ishikawa et al. |
| 6,370,488 B1 | 4/2002 | Beaudoin et al. |
| 6,394,343 B1 | 5/2002 | Berg et al. |
| 6,402,029 B1 | 6/2002 | Gangi |

| | | |
|---|---|---|
| 6,403,029 B1 | 6/2002 | Schmidt |
| 6,425,523 B1 | 7/2002 | Shem-Ur et al. |
| 6,473,500 B1 | 10/2002 | Risafi et al. |
| 6,505,772 B1 | 1/2003 | Mollett et al. |
| 6,518,927 B2 | 2/2003 | Schremmer et al. |
| 6,607,127 B2 | 4/2003 | Wong |
| 6,574,730 B1 | 6/2003 | Bissell et al. |
| 6,592,044 B1 | 7/2003 | Wong et al. |
| 6,609,654 B1 | 8/2003 | Anderson et al. |
| 6,636,833 B1 | 10/2003 | Flitcroft et al. |
| 6,685,088 B1 | 2/2004 | Royer et al. |
| 6,755,341 B1 | 6/2004 | Wong et al. |
| 6,755,344 B1 | 6/2004 | Mollett et al. |
| 6,789,189 B2 | 9/2004 | Wheeler et al. |
| 6,805,288 B2 | 10/2004 | Routhenstein et al. |
| 6,820,199 B2 | 11/2004 | Wheeler et al. |
| 6,827,260 B2 | 12/2004 | Stoutenburg et al. |
| 6,834,270 B1 | 12/2004 | Pagani et al. |
| 6,851,054 B2 | 2/2005 | Wheeler et al. |
| 6,857,566 B2 | 2/2005 | Wankmueller |
| 6,886,742 B2 | 5/2005 | Stoutenburg et al. |
| 6,915,279 B2 | 7/2005 | Hogan et al. |
| 6,915,430 B2 | 7/2005 | Wheeler et al. |
| 6,935,559 B2 | 8/2005 | Mollett et al. |
| 6,938,156 B2 | 8/2005 | Wheeler et al. |
| 6,938,821 B2 * | 9/2005 | Gangi ........................ 235/380 |
| 6,950,940 B2 | 9/2005 | Wheeler et al. |
| 6,952,773 B2 | 10/2005 | Wheeler et al. |
| 6,957,770 B1 | 10/2005 | Robinson |
| 6,959,381 B2 | 10/2005 | Wheeler et al. |
| 6,978,369 B2 | 12/2005 | Wheeler et al. |
| 6,981,154 B2 | 12/2005 | Wheeler et al. |
| 6,990,470 B2 | 1/2006 | Hogan et al. |
| 6,991,157 B2 | 1/2006 | Bishop et al. |
| 6,991,160 B2 | 1/2006 | Demere |
| 6,993,510 B2 | 1/2006 | Guy et al. |
| 7,003,493 B2 | 2/2006 | Weichert et al. |
| 7,010,691 B2 | 3/2006 | Wheeler et al. |
| 7,058,611 B2 | 6/2006 | Kranzley et al. |
| 7,083,087 B1 | 8/2006 | Gangi |
| 7,195,154 B2 | 3/2007 | Routhenstein |
| 2001/0034720 A1 | 10/2001 | Armes |
| 2001/0045454 A1 | 11/2001 | Gangi |
| 2001/0047335 A1 | 11/2001 | Arndt et al. |
| 2001/0048023 A1 | 12/2001 | Fitzmaurice et al. |
| 2002/0007320 A1 | 1/2002 | Hogan et al. |
| 2002/0035548 A1 | 3/2002 | Hogan et al. |
| 2002/0083010 A1 | 6/2002 | Kim |
| 2002/0087462 A1 | 7/2002 | Seifert et al. |
| 2002/0104878 A1 | 8/2002 | Seifert et al. |
| 2002/0112160 A2 | 8/2002 | Wheeler et al. |
| 2002/0120584 A1 | 8/2002 | Hogan et al. |
| 2002/0138363 A1 | 9/2002 | Karas et al. |
| 2002/0138424 A1 | 9/2002 | Coyle |
| 2002/0139849 A1 | 10/2002 | Gangi |
| 2002/0143566 A1 | 10/2002 | Diveley |
| 2002/0143706 A1 | 10/2002 | Diveley |
| 2002/0152168 A1 | 10/2002 | Neofytides et al. |
| 2002/0152176 A1 | 10/2002 | Neofytides et al. |
| 2002/0153414 A1 | 10/2002 | Stoutenburg et al. |
| 2002/0156683 A1 | 10/2002 | Stoutenburg et al. |
| 2002/0161702 A1 | 10/2002 | Milberger et al. |
| 2002/0166891 A1 | 11/2002 | Stoutenburg et al. |
| 2002/0169719 A1 | 11/2002 | Dively et al. |
| 2002/0174014 A1 | 11/2002 | Cuervo |
| 2002/0178025 A1 | 11/2002 | Hansen et al. |
| 2002/0198806 A1 | 12/2002 | Blagg et al. |
| 2003/0021242 A1 | 1/2003 | Drysdale et al. |
| 2003/0024979 A1 | 2/2003 | Hansen et al. |
| 2003/0036956 A1 | 2/2003 | Karas et al. |
| 2003/0051145 A1 | 3/2003 | Jackson et al. |
| 2003/0055780 A1 | 3/2003 | Hansen et al. |
| 2003/0065624 A1 | 4/2003 | James et al. |
| 2003/0069856 A1 | 4/2003 | Seifert et al. |
| 2003/0083987 A1 | 5/2003 | Stoutenburg et al. |
| 2003/0093367 A1 | 5/2003 | Allen-Roumann et al. |
| 2003/0095665 A1 | 5/2003 | Wheeler et al. |
| 2003/0097561 A1 | 5/2003 | Wheeler et al. |
| 2003/0097562 A1 | 5/2003 | Wheeler et al. |
| 2003/0097565 A1 | 5/2003 | Wheeler et al. |
| 2003/0097569 A1 | 5/2003 | Wheeler et al. |
| 2003/0097570 A1 | 5/2003 | Wheeler et al. |
| 2003/0097573 A1 | 5/2003 | Wheeler et al. |
| 2003/0101136 A1 | 5/2003 | Wheeler et al. |
| 2003/0101344 A1 | 5/2003 | Wheeler et al. |
| 2003/0110129 A1 | 6/2003 | Frazier et al. |
| 2003/0115463 A1 | 6/2003 | Wheeler et al. |
| 2003/0120498 A1 | 6/2003 | Villapudua |
| 2003/0120615 A1 | 6/2003 | Kuo |
| 2003/0126036 A1 | 7/2003 | Mascavage, III et al. |
| 2003/0126067 A1 | 7/2003 | Seifert et al. |
| 2003/0126075 A1 | 7/2003 | Mascavage, III et al. |
| 2003/0126083 A1 | 7/2003 | Seifert et al. |
| 2003/0126437 A1 | 7/2003 | Wheeler et al. |
| 2003/0126438 A1 | 7/2003 | Wheeler et al. |
| 2003/0126439 A1 | 7/2003 | Wheeler et al. |
| 2003/0130907 A1 | 7/2003 | Karas et al. |
| 2003/0130940 A1 | 7/2003 | Hansen et al. |
| 2003/0130948 A1 | 7/2003 | Algiene et al. |
| 2003/0131234 A1 | 7/2003 | Wheeler et al. |
| 2003/0131235 A1 | 7/2003 | Wheeler et al. |
| 2003/0135438 A1 | 7/2003 | Blagg et al. |
| 2003/0135459 A1 | 7/2003 | Abelman et al. |
| 2003/0154164 A1 | 8/2003 | Mascavage, III et al. |
| 2003/0155416 A1 | 8/2003 | Macklin et al. |
| 2003/0158818 A1 | 8/2003 | George et al. |
| 2003/0171992 A1 | 9/2003 | Blagg et al. |
| 2003/0172039 A1 | 9/2003 | Guy et al. |
| 2003/0177067 A1 | 9/2003 | Cowell et al. |
| 2003/0182218 A1 | 9/2003 | Blagg |
| 2003/0187712 A1 | 10/2003 | Arthus et al. |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2003/0229541 A1 | 12/2003 | Randall et al. |
| 2003/0229578 A1 | 12/2003 | Hansen et al. |
| 2003/0236747 A1 | 12/2003 | Sager |
| 2004/0006537 A1 | 1/2004 | Zelecoski et al. |
| 2004/0030647 A1 | 2/2004 | Hansen et al. |
| 2004/0030657 A1 | 2/2004 | Holm-Blagg et al. |
| 2004/0039693 A1 | 2/2004 | Nauman et al. |
| 2004/0039702 A1 | 2/2004 | Blair et al. |
| 2004/0049452 A1 | 3/2004 | Blagg |
| 2004/0054625 A1 | 3/2004 | Kellogg et al. |
| 2004/0064405 A1 | 4/2004 | Weichert |
| 2004/0065726 A1 | 4/2004 | McGee et al. |
| 2004/0068437 A1 | 4/2004 | McGee et al. |
| 2004/0073511 A1 | 4/2004 | Beaumont et al. |
| 2004/0078327 A1 | 4/2004 | Frazier et al. |
| 2004/0083184 A1 | 4/2004 | Tsuei et al. |
| 2004/0088261 A1 | 5/2004 | Moore et al. |
| 2004/0112952 A1 | 6/2004 | Algiene et al. |
| 2004/0117299 A1 | 6/2004 | Algiene et al. |
| 2004/0117302 A1 | 6/2004 | Weichert et al. |
| 2004/0138947 A1 | 7/2004 | McGee et al. |
| 2004/0139008 A1 | 7/2004 | Mascavage |
| 2004/0148203 A1 | 7/2004 | Whitaker et al. |
| 2004/0148239 A1 | 7/2004 | Albee et al. |
| 2004/0148286 A1 | 7/2004 | Rogers |
| 2004/0153398 A1 | 8/2004 | Baumgartner et al. |
| 2004/0158521 A1 | 8/2004 | Newton et al. |
| 2004/0159699 A1 | 8/2004 | Nelson et al. |
| 2004/0186773 A1 | 9/2004 | George et al. |
| 2004/0193551 A1 | 9/2004 | McGee et al. |
| 2004/0199461 A1 | 10/2004 | Hansen |
| 2004/0205023 A1 | 10/2004 | Hafer et al. |

| Publication No. | Date | Name |
|---|---|---|
| 2004/0210476 A1 | 10/2004 | Blair et al. |
| 2004/0210506 A1 | 10/2004 | Algiene et al. |
| 2004/0210521 A1 | 10/2004 | Crea et al. |
| 2004/0210523 A1 | 10/2004 | Gains et al. |
| 2004/0211830 A1 | 10/2004 | Algiene |
| 2004/0211831 A1 | 10/2004 | Stoutenburg et al. |
| 2004/0215557 A1 | 10/2004 | Michelsen |
| 2004/0215574 A1 | 10/2004 | Michelsen et al. |
| 2004/0230527 A1 | 11/2004 | Hansen et al. |
| 2004/0254894 A1 | 12/2004 | Tsuei et al. |
| 2004/0260653 A1 | 12/2004 | Tsuei et al. |
| 2005/0005117 A1 | 1/2005 | Wheeler et al. |
| 2005/0005118 A1 | 1/2005 | Wheeler et al. |
| 2005/0005123 A1 | 1/2005 | Wheeler et al. |
| 2005/0005124 A1 | 1/2005 | Wheeler et al. |
| 2005/0010505 A1 | 1/2005 | Darrell |
| 2005/0015280 A1 | 1/2005 | Gabel et al. |
| 2005/0017067 A1 | 1/2005 | Seifert et al. |
| 2005/0044373 A1 | 2/2005 | Wheeler et al. |
| 2005/0075974 A1 | 4/2005 | Turgeon |
| 2005/0080691 A1 | 4/2005 | Holm-Blagg |
| 2005/0080730 A1 | 4/2005 | Sorrentino |
| 2005/0091116 A1 | 4/2005 | Monk |
| 2005/0091153 A1 | 4/2005 | Monk |
| 2005/0107152 A1 | 5/2005 | McGee et al. |
| 2005/0108127 A1 | 5/2005 | Brown et al. |
| 2005/0108130 A1 | 5/2005 | Monk |
| 2005/0114217 A1 | 5/2005 | Monk |
| 2005/0116027 A1 | 6/2005 | Algiene et al. |
| 2005/0119968 A1 | 6/2005 | Michelsen et al. |
| 2005/0119969 A1 | 6/2005 | Michelsen et al. |
| 2005/0137986 A1 | 6/2005 | Kean |
| 2005/0167481 A1 | 8/2005 | Hansen et al. |
| 2005/0177496 A1 | 8/2005 | Blagg et al. |
| 2005/0185774 A1 | 8/2005 | Grear et al. |
| 2005/0185780 A1 | 8/2005 | Grear et al. |
| 2005/0187782 A1 | 8/2005 | Grear et al. |
| 2005/0187830 A1 | 8/2005 | Grear et al. |
| 2005/0187841 A1 | 8/2005 | Grear et al. |
| 2005/0187864 A1 | 8/2005 | Grear et al. |
| 2005/0187865 A1 | 8/2005 | Grear et al. |
| 2005/0187870 A1 | 8/2005 | Grear et al. |
| 2005/0187938 A1 | 8/2005 | Grear et al. |
| 2005/0192874 A1 | 9/2005 | Grear et al. |
| 2005/0192895 A1 | 9/2005 | Rogers et al. |
| 2005/0192897 A1 | 9/2005 | Rogers et al. |
| 2005/0209961 A1 | 9/2005 | Michelsen et al. |
| 2005/0211763 A1 | 9/2005 | Sgambati et al. |
| 2005/0234817 A1 | 10/2005 | Van Fleet et al. |
| 2005/0234822 A1 | 10/2005 | Van Fleet et al. |
| 2005/0261968 A1 | 11/2005 | Randall et al. |
| 2005/0263587 A1 | 12/2005 | Martinez |
| 2005/0267840 A1 | 12/2005 | Holm-Blagg et al. |
| 2005/0288964 A1 | 12/2005 | Lutzen et al. |
| 2006/0005192 A1 | 1/2006 | Prendergast et al. |
| 2006/0016879 A1 | 1/2006 | Kean |
| 2006/0028319 A1 | 2/2006 | Kean et al. |
| 2006/0036496 A1 | 2/2006 | Cowell et al. |
| 2006/0036543 A1 | 2/2006 | Blagg et al. |
| 2006/0059040 A1 | 3/2006 | Eldred et al. |

FOREIGN PATENT DOCUMENTS

| | | |
|---|---|---|
| DE | 100 50 882 A1 | 5/2002 |
| EP | 0661675 A2 | 5/1995 |
| EP | 0656600 A2 | 6/1995 |
| EP | 0722241 A2 | 12/1996 |
| EP | 1017030 A2 | 7/2000 |
| EP | 1028401 A2 | 8/2000 |
| JP | 55143679 A | 11/1980 |
| JP | 61253580 | 11/1986 |
| JP | 02146374 | 6/1990 |
| JP | 05040864 | 2/1993 |
| JP | 2004102784 | 4/2004 |
| WO | WO 92/16913 A1 | 10/1992 |
| WO | WO 98/10363 | 3/1998 |
| WO | WO 98/12675 | 3/1998 |
| WO | WO 99/05633 A1 | 2/1999 |
| WO | WO 99/38129 A1 | 7/1999 |
| WO | WO 99/49424 A1 | 9/1999 |
| WO | WO 99/57675 A1 | 11/1999 |
| WO | WO 00/25262 A1 | 5/2000 |
| WO | WO 00/30048 A1 | 5/2000 |
| WO | WO 00/33497 A2 | 6/2000 |
| WO | WO 00/49588 A1 | 8/2000 |
| WO | WO 00/52900 A1 | 9/2000 |
| WO | WO 00/54208 A2 | 9/2000 |
| WO | WO 01/29789 A1 | 4/2001 |
| WO | WO 01/46902 A1 | 6/2001 |
| WO | WO 01/50429 A | 7/2001 |
| WO | WO 01/54082 A2 | 7/2001 |
| WO | WO 01/61920 A1 | 8/2001 |
| WO | WO 01/69556 A2 | 9/2001 |
| WO | WO 01/71675 A1 | 9/2001 |
| WO | WO 01/78024 A2 | 10/2001 |
| WO | WO 01/88659 A1 | 11/2001 |
| WO | WO 2005/052871 A1 | 6/2005 |

OTHER PUBLICATIONS

Dr. Klaus Vedder and Dr. Franz Weikmann, Giesecke & Devrient, "Smart Cards—Requirements, Properties and Applications", 1998.
"ActivCard", ActivCard, Inc., 1998.
OKI Advanced Products, OKI America, Inc., "Value-Checker.TM. CP", 1998.
Logis Chipcard Products, "Logismart Chipcard Readers—Worth Your Attention", 1998.
Setec Oy, "Setpurse.TM.", 1998.
NURI Information & Communication Inc., "NURI Smart Card Solutions", 1998.
Visa U.S. S., "Visa® Smart".
ViVOwallett, found at www.vivotech.com.
Lindenmayer, Article, American Banker, titled First Data, Grocer Tie ACH Payments to Loyalty Cards, Feb. 8, 2006.
R. Zapata, article, titled Visa Hit with Suit Over No-Contact Credit Cards, Portfolio Media, Oct. 4, 2007.
EMV '96 Integrated Circuit Card Application Specification for Payment Systems, Version 3.1.1 (May 31, 1998).
ISO/IEC JTC 1/SC 27 Information Technology-Security Techniques (May 10, 1999).
File History of Gangi, U.S. Patent 6,938,821, (U.S. Appl. No. 10/052,405) including arguments from the Examiner and arguments in support of patentability.
File History of Gangi, U.S. Patent 7,083,087 (U.S. Appl. No. 11/130,765), including arguments from the Examiner and arguments in support of patentability.
File History of Gangi, U.S. Appl. No. 11/929,592.
Partial File History of Gangi U.S. Appl. No. 10/235,012, abandoned.
Partial File History of Gangi, U.S. Patent 6,131,811 (U.S. Appl. No. 09/087,193), including arguments from the Examiner and arguments in support of patentability.
Partial File History of Gangi U.S. Patent 6,293,462 (U.S. Appl. No. 09/818,407), including arguments from the Examiner and arguments in support of patentability.
Partial File History of Gangi U.S. Patent 6,402,029 (U.S. Appl. No. 09/664,205), including arguments from the Examiner and arguments in support of patentability.
File History of Gangi U.S. Appl. No. 11/923,049.
File History of Gangi U.S. Appl. No. 11/931,479.
File History of Gangi U.S. Appl. No. 09/923,617, including arguments from the Examiner and arguments in support of patentability.

* cited by examiner

FIG. 2.

| | RECORDING DENSITY (bits per inch) | | CHARACTER CONFIGURATION (including parity bit) | INFORMATION CONTENT (including control characters) |
|---|---|---|---|---|
| 0.110" | TRACK 1 IATA | 210 BPI | 7 BITS PER CHARACTER | 79 ALPHANUMERIC CHARACTERS |
| 0.110" | TRACK 2 ABA | 75 BPI | 5 BITS PER CHARACTER | 40 NUMERIC CHARACTERS |
| 0.110" | TRACK 3 THRIFT | 210 BPI | 5 BITS PER CHARACTER | 107 NUMERIC CHARACTERS |

76 ALPHA NUMERIC DATA CHARACTERS

| SS | FC | PAN | FS | NAME | FS | ADDITIONAL DATA | | DISCRETIONARY DATA | | ES | LRC |
|---|---|---|---|---|---|---|---|---|---|---|---|
| | | Primary Account No. (19 digits Max) | | Name (26 alphanumeric characters Max) | | | NO. OF CHARACTERS | | NO. OF CHARACTERS | | |
| | | | | | | Expiration Date (YYMM) | 4 | PVK1 | 1 | | |
| | | | | | | Service Code | 3 | PW OR Offset | 4 | | |
| | | | | | | | | CW or CVC | 3 | | |
| | | | | | | | | Some or all of the above fields may be found within the Discretionary data. | | | |

← 104 ALPHA NUMERIC DATA CHARACTERS →

| SS | FC | PAN | FS | USE AND SECURITY DATA | ADDITIONAL DATA | ES | LRC |
|---|---|---|---|---|---|---|---|
| | | Primary Account No. (19 digits Max) | | NO. OF CHARACTERS | NO. OF CHARACTERS | | |
| | | | | Country Code (opt.) 3 | First Subsidiary Account Number (opt.) | | |
| | | | | Currency Code 3 | | | |
| | | | | Currency Exponent 1 | Secondary Subsidiary Account Number (opt.) | | |
| | | | | Amount Authorized per Cycle 4 | | | |
| | | | | Amount Remaining this Cycle 4 | Relay Marker 1 | | |
| | | | | Cycle Begin (Validity Datae) 4 | | | |
| | | | | Cycle Length 2 | Cryptographic Check Digits (opt.) 6 | | |
| | | | | Retry Count 1 | | | |
| | | | | PIN Control Parameters 6 | Discretionary Data | | |
| | | | | Interchange Control 1 | | | |
| | | | | PAN Service Restriction 2 | | | |
| | | | | SAN-1 Service Restriction 2 | | | |
| | | | | SAN-2 Service Restriction 2 | | | |
| | | | | Expiration Date (opt.) 4 | | | |
| | | | | Card Sequence Number 1 | | | |
| | | | | Card Security Number (opt.) 9 | | | |

FIG. 5.

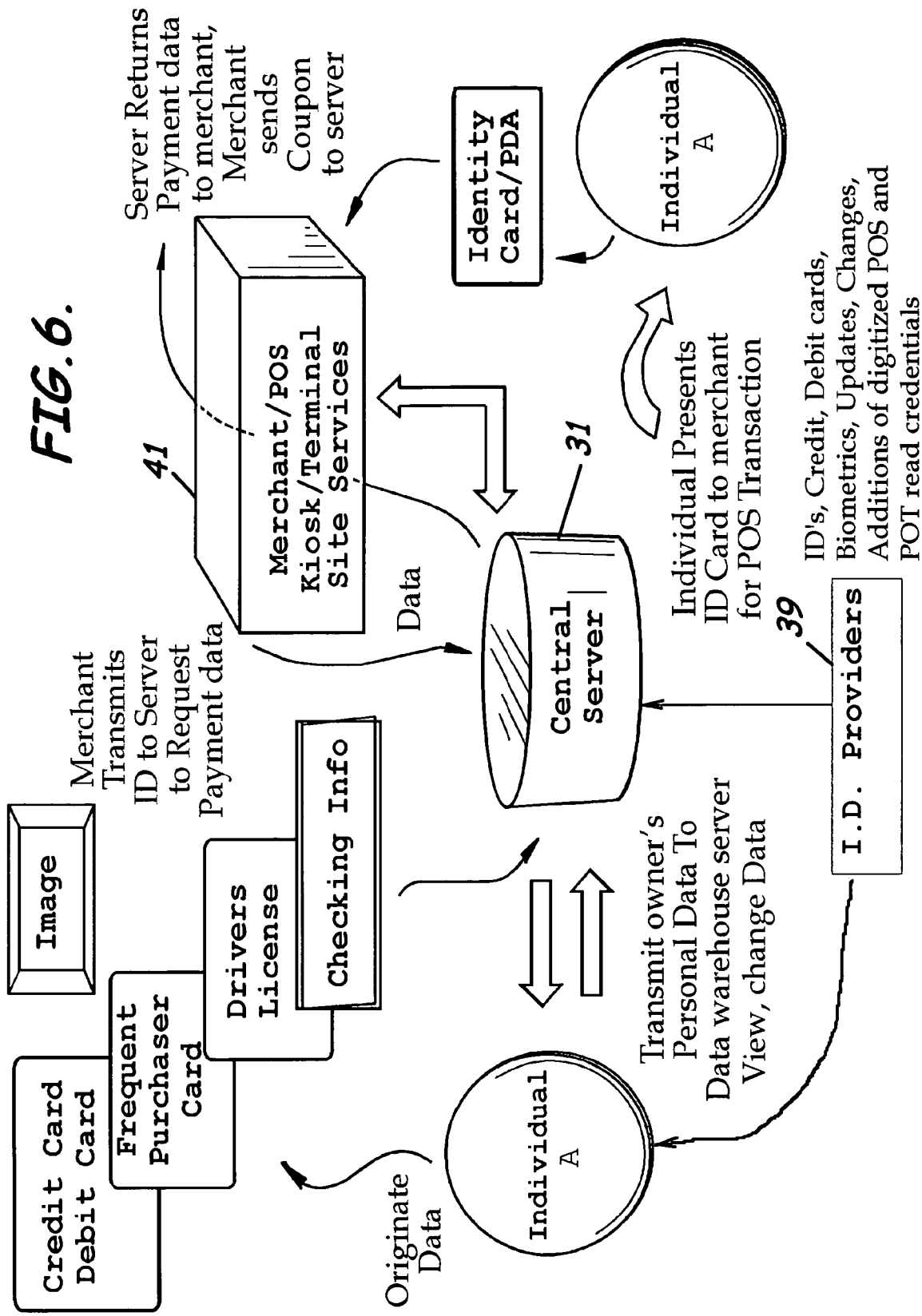

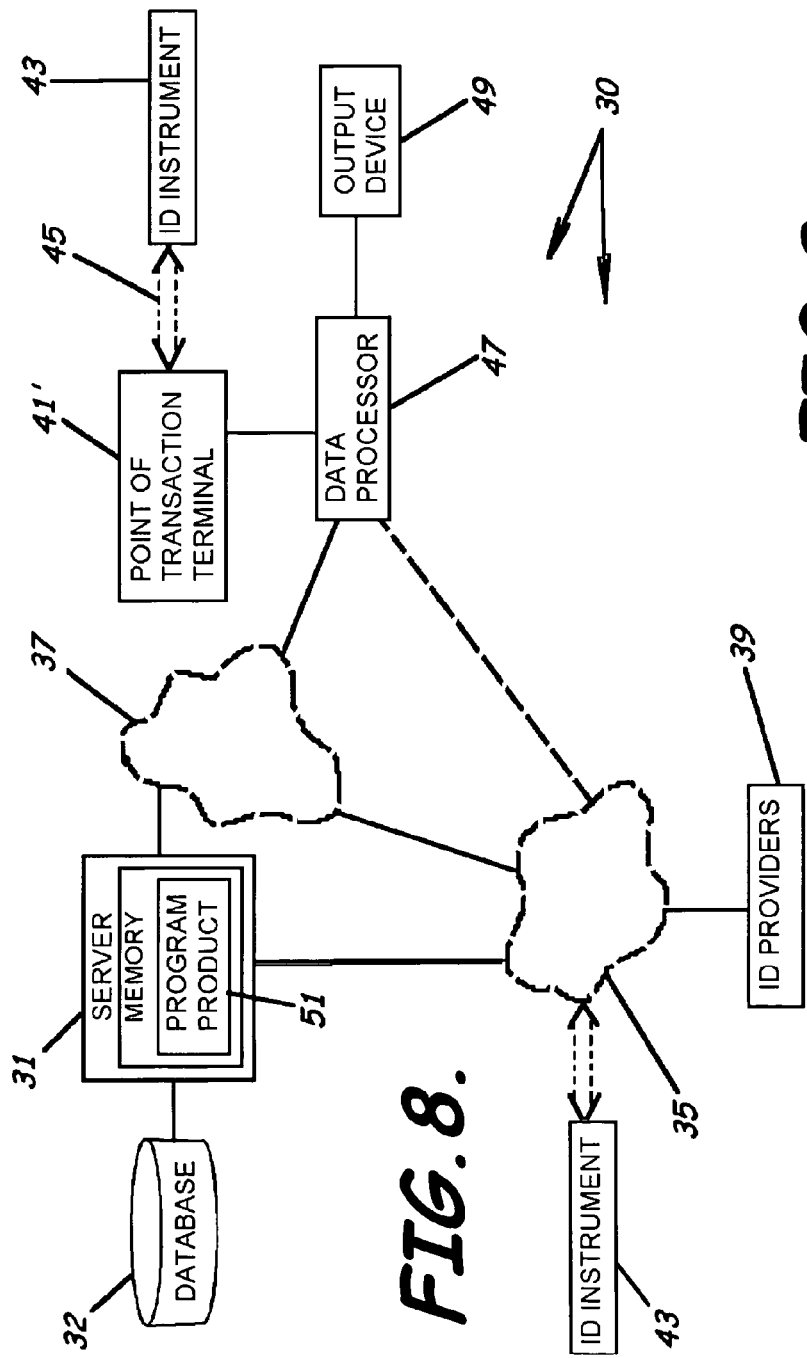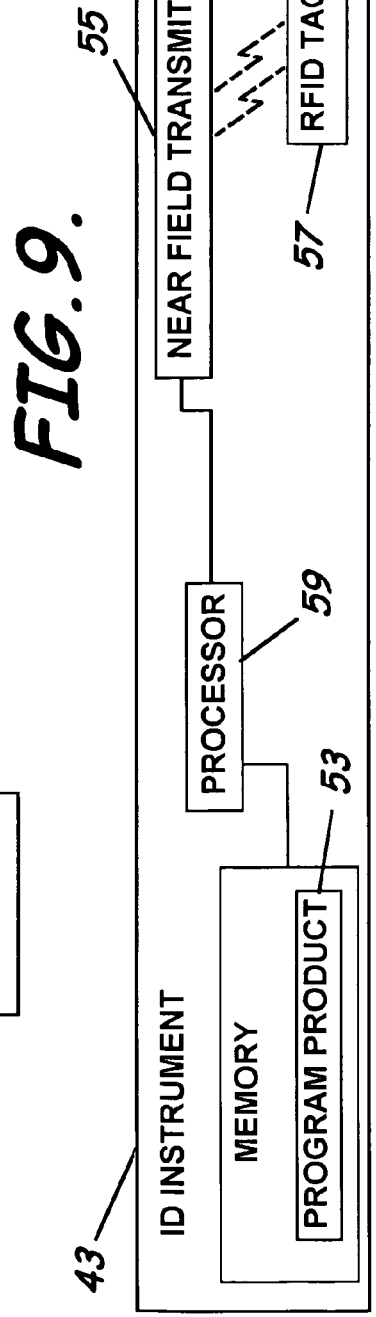

SYSTEM FOR ASSOCIATING IDENTIFICATION AND PERSONAL DATA FOR MULTIPLE MAGNETIC STRIPE CARDS OR OTHER SOURCES TO FACILITATE A TRANSACTION AND RELATED METHODS

RELATED APPLICATIONS

This application is a continuation-in-part of and claims priority to and the benefit of U.S. patent application Ser. No. 11/130,765, filed on May 17, 2005 now U.S. Pat. No. 7,083,087, which is a continuation of U.S. patent application Ser. No. 10/052,405, filed Jan. 17, 2002, now U.S. Pat. No. 6,938,821, which is a continuation-in-part of U.S. patent application Ser. No. 09/664,205, filed on Sep. 18, 2000, now U.S. Pat. No. 6,402,029, which is a continuation-in-part of U.S. patent application Ser. No. 09/618,407, filed on Jul. 18, 2000, now U.S. Pat. No. 6,293,462, which is a continuation of U.S. application Ser. No. 09/087,193, filed on May 29, 1998, now U.S. Pat. No. 6,131,811 all incorporated herein by reference in their entirety.

BACKGROUND OF THE INVENTION

1. Field of the Invention

The present invention relates generally to an improvement for the use of magnetic striping on devices such as credit cards and the like, and in particular, but not by way of any limitation to a methodology and improved magnetic stripe card which is capable of encoding additional information other than that originally presented on the card, particularly identification and personal data.

2. Description of the Related Art

In today's electronic commerce there has been a proliferation in the use of various types of credit, debit, identification and other types of authorization cards. For example, an average individual is likely to carry a driver's license, several credit and/or debit cards, an identification card for access to a health club, an identification card to gain access to a place of employment and an access card to gain entry into a parking garage, among others. Furthermore, with advances in electronic commerce, smart cards are likely to replace paper and coin money resulting in an additional card for consumers to carry. Each of these cards typically incorporates a magnetic stripe or bar code to facilitate easy recognition of the card and to store various types of data. Although the use of these cards allow for easy and efficient electronic commerce, the number of such cards quickly becomes cumbersome and many individuals find carrying the large number of cards inconvenient.

Prior art magnetic stripe credit cards and the like have various limitations. For example, virtually all the prerecorded magnetic stripe cards that are currently in use are used for a single purpose. For example, a credit card or an identity card is generally used for just that purpose alone. In many instances, owners and users of these type of cards need to present several cards in order to maximize or complete a given transaction. Specifically, a discount card such as is used in certain supermarkets as well as the credit card to make the purchase must be both presented so as to obtain the discount.

Various solutions such as providing a sticker which can be placed on a credit card or the like have been suggested, however, these defeat the purpose of having an increased level of automation for check outs for example.

There are many instances whereby an individual, consumer, entity, organization, etc., would find it desirable to provide others with a secure, customized set of ID data that would facilitate a transaction and or event of a specific type. Additionally, the receiver of the data for the transaction may wish to provide complimenting and supplemental data back to the originator of the transaction and all such transactions being done in a digitized format to be interpreted, manipulated and/or displayed on Point-of sale transaction (POS) devices/computers both at the POS and remotely. Additionally, the process of initializing this secure transaction would be more flexible if the acceptors of the transaction could utilize a magnetic stripe card that could combine a unique identifying code with the standard ISO data from other completely different financial or other card's magnetically striped data.

SUMMARY OF THE INVENTION

In view of the foregoing, embodiments of the present invention provide a solution which is both cost efficient and time efficient and which allows the use of conventional types of magnetic stripe readers which are currently being used in most retail establishments. One embodiment of the present invention allows for a single swipe of the card through the magnetic strip reader to provide all the information in one pass. This can be accomplished by recording onto the conventional magnetic strip of the credit card, the desired data from multiple cards and other sources which are necessary to complete a chosen transaction. In particular, a secure, customized set of identification data may be used to facilitate a transaction or even of a specific type.

Embodiments of the present invention employ a system and method for providing a customized set of identification data to facilitate a transaction, and apparatus for providing onto the magnetic stripe of a card, additional information and for consolidating multiple information from multiple cards as well as other sources onto the magnetic stripe card. In order to do so, a wallet consolidator, such as that shown in co-pending U.S. Pat. No. 6,131,811 by Gangi titled "Wallet Consolidator," can be employed. Although other types of readers and writers could be used to generate this data, this invention should in no way be considered to be limited to the use of any specific wallet consolidator or other means such as is mentioned above. Specifically, a device such as, for example, a wallet consolidator can be used in which the magnetic stripe information from multiple credit cards can be read from what is generally the commonly used three ISO/8711 tracks that are present on the card. However, it should be noted that in many types of credit cards one or more of these tracks may have no data provided on the card. What then can be accomplished is the reading of multiple tracks from multiple cards storing this all in memory and then rewriting the information to either a blank card or to the existing card after erasing the information along with, if necessary, additional "foreign" data onto the card. In another embodiment it may be possible to write the additional foreign data on an existing card without an erasure and re-writing of the data, however this is not the preferred mode of operation.

According to an embodiment of the present invention, a secure, customized set of personal identification data is placed at the end of any data which was originally on the track or on an empty track. It may also be placed at any other position that the reading software in a point-of-sale (POS) or other point of transaction (POT) type terminal would have or would find to be ideal, this could also be at the front of a track for example or embedded within the track. The data of each track is formatted with a start sentinel character followed by the data itself followed by a stop sentinel. This data is then used to facilitate a transaction and/or event of a specific type. Conventional magnetic swipe readers look for the start or stop sentinel to indicate that a body of data follows. It should be noted however, that some readers will read the data irrespective of which way the card is swiped through the reader. The electronic circuitry in these types of readers detect the direction of the swipe by noting whether a start or stop sentinel is received first. This means that foreign data placed after the stop sentinel will not be recognized if it is not bracketed by standard start and stop sentinels.

The ISO-8711 standard specifies that at least two machine control codes for each type of track specifically, the types of tracks can be for example 75 or 210 bpi. These control codes can be used to bracket the foreign data. It would then be possible to design the reader that will look for data bracketed by the special control codes and/or designed software that will look for the data bracketed by these special control codes after a standard stop sentinel. Foreign data such as a coupon information, a discount card number or the like may be written in any track that was originally unused or even if used after a stop sentinel is present, and if that foreign data is bracketed by these special control codes then the foreign data will not be read by standard magnetic swipe readers and therefore will be ignored. However, special readers in the software at the host computer for the transaction can look for these control codes and then confine the foreign data and organize it in a manner acceptable for multiple purposes in the individual cards. This makes it possible to have additional information placed on the magnetic stripe card which would not be read by conventional readers in the field but would be obtainable from specialized readers.

Embodiments in the present invention include a system which can provide a customized set of identification data to facilitate a transaction. For example, according to an embodiment of the present invention, a system can include a server configured to store a plurality of sets of personal data and a plurality of personal control IDs associated with a respective different person and a respective set of personal data entered into the server and controlled by the respective different person via the Internet or via a point of transaction and configured to store a data profile derived from a set of personal data associated with a personal control ID identifying a selected different person and assembled together by the selected different person for use by a selected one of one or more providers identified by a respective provider ID. The system also includes a data processor remote from and in communication with the server, and a terminal positioned at a point-of-sale or other point of transaction and in communication with the data processor. The data processor can be configured to transmit or otherwise send to the server the personal control ID identifying the selected different person and a provider ID identifying the selected provider. The terminal is adapted to couple to an ID instrument via a data communication link to receive from the ID instrument the personal control ID identifying the selected different person and to send the personal control ID identifying the selected different person to the data processor. The server is correspondingly further configured to retrieve from the plurality of sets of personal data the data profile derived from the set of personal data associated with the personal control ID identifying the selected different person and is configured to transmit or otherwise send to the data processor the data profile for use by the selected provider identified by the provider ID. An output device can be connected to the data processor and/or terminal to receive from or through the data processor the data profile received from the server and to output the data profile to the selected provider to thereby verify the personal control ID as being associated with a user of the personal control ID at the point of sale or other point of transaction prior to proceeding with a transaction.

According to another embodiment of the present invention, the system includes a point of transaction (POT) terminal adapted to couple to an ID instrument via a data communication link to receive from the ID instrument a personal control ID identifying a selected different person and to send the personal control ID identifying the selected different person. The system includes a server configured to store a plurality of personal control IDs and a plurality of sets of personal data entered into the server and controlled by each respective different person via the Internet or via a point of transaction, and configured to store a data profile derived from a set of personal data associated with the personal control ID identifying the selected different person and assembled together by the selected different person for use by a selected one of one or more providers identified by a provider ID. The server is also configured to retrieve from the plurality of sets of personal data the data profile derived from the set of personal data associated with the personal control ID identifying the selected different person, and configured to send the data profile for use by the selected provider identified by the provider ID. The system can also include an output device. The output device is configured to receive at least a portion of the data profile sent from the server and configured to output the data profile to the selected provider to thereby verify the personal control ID as being associated with a user of the personal control ID at the point of transaction prior to proceeding with a transaction.

According to another embodiment of the present invention, the system includes a computer having memory, a database in communication with the computer to store a plurality of personal control IDs and a plurality of sets of personal data, and program product stored in the memory of the computer. The program product can include instructions to perform the operations of receiving a set of personal data from a remotely positioned user, requesting and receiving a personal ID from the user to associate with a set of personal data, storing the personal ID and the set of personal data in the database, receiving a request from a point of transaction terminal or associated data processing for at least a portion of the set of personal data of the user accompanied by both the personal ID of the user and a provider ID, and providing customized information based on a data profile derived from the set of personal data of the user for use by the provider identified by the provider ID.

Embodiments of the present invention also include a method for providing a customized set of identification data to facilitate a transaction. For example, a method can include receiving a set of personal data from the user, receiving a personal ID from the user to associate with the set of personal data, storing the personal ID and the set of personal data in a database, and loading an ID instrument with the personal ID and transaction data. The method also includes acquiring a personal ID of a user from an ID instrument, for example, at a point-of-sale or other point of transaction, and submitting a request to a remote computer in communication with the database for at least a portion of a set of personal data of the user along with both the personal ID of the user and a provider ID of a provider. The method can also include deriving a data profile from the set of personal data of the user for use by the provider identified by the provider ID responsive to the personal ID and the provider ID, and providing customized data based on the data profile for use by the provider identified by the provider ID, for example, to identify the user. The method can further include generating incentives to the user for making future purchases responsive to receipt of personal data related to the personal ID. The incentives can include, for example, a coupon or a discount offer. Changes, updates, and additions can also be received from providers of components of data profiles and processed accordingly.

A method for providing a customized set of identification data to facilitate a transaction, according to an embodiment of the present invention, can include providing credentials to a first user by an ID provider, storing the credentials in the memory of a first ID instrument, and forwarding the credentials to a second ID instrument in the possession of a second user to thereby allow for receipt of data otherwise stored on the first ID instrument. The forwarding can be directly between ID instruments or indirectly through a central server.

Embodiments of the present invention can also include a computer readable medium that is readable by a computer providing a customized set of identification data to facilitate a transaction. For example, a computer readable medium can include a set of instructions that, when executed by the computer, cause the computer to perform the operations of receiving a set of personal data from a remotely positioned user, receiving a personal ID from the user to associate with the set of personal data, associating and storing the personal ID and set of personal data in a database in communication with the computer, and sending the personal ID and/or transaction data via the Internet or a point of transaction to load on an ID instrument. The instructions can also include those to perform the operation of receiving a request for at least a portion of the set of personal data of the user along with both the personal ID of the user and a provider ID of a provider from a point-of-sale terminal, a point of transaction terminal, and a data processor in communication with the computer and the point-of-sale terminal or other point of transaction terminal. The instructions can also include those to perform the operations of deriving a data profile from the set of personal data of the user responsive to the personal ID and the provider ID, and providing customized data responsive to the data profile for use by the provider, for example, in identifying the user, verifying the identity of the user, and/or supplementing additional transactional information beyond that stored on an ID instrument.

A computer readable medium, according to an embodiment of the present invention, that is readable by at least one processor, e.g., that associated with a server, ID provider, and/or one or more ID instrument processors is also provided. The computer readable medium can include a set of instructions that, when executed by the at least one processor, cause the at least one processor to perform the operations of providing credentials to a first user by an ID provider and storing the credentials in the memory of a first ID instrument to thereby facilitate a transaction at a point-of-sale or other point of transaction. Additionally, the instructions can include those to perform the operation of forwarding the credentials to a second ID instrument in the possession of a second user either directly from the first user or from a central computer to thereby allow for receipt of data otherwise stored on the first ID instrument. Such credentials can advantageously allow the second user, e.g., a family member, to have, for example, access to financial instruments owned by the first user such as, e.g., a credit card, debit card, or bank account.

Embodiments of the present invention can allow one personal ID or set of credentials to access other secure personal data including other credentials associated with one or more providers of such ID/credentials. For example, a loyalty card issued by a retail sales provider can be used to access a major credit card provided by a credit provider. A list of devices by provider/location, date and time to be activated/deactivated can be maintained and linked with a personal ID or set of credentials to allow access thereto. Examples of such devices can include a door, turnstile, gate to a secure location for events, visitor or member admittance, and security doors. Other such devices can include automatic teller machines or other self-service devices that require identification. Such activation can be authorized by use of ID instruments that incorporate a readable storage medium such as, for example, those employing RFID, RF, magnetic strip, bar-code, optical, audio, and/or IR technology in concert with enabled devices such as, for example, a cell phone or PDA. For example, through use of the system and methods disclosed herein, a driver's license having a magnetic strip or RFID tag can be used to activate an on-site peripheral device such as, for example, a gasoline pump lock or security gate. Advantageously, this process can be utilized via any of the previously registered profile attributes, cards, and/or data registered by the owner of the profile (credentials).

Advantageously, embodiments of the present invention allow for sharing of a personal ID or set of credentials by the owner of the credentials with another user to allow access by the other user to such credentials. For example, a parent can provide a child the parent's personal ID to allow the child to access the parent's credit or debit card account, negating any need to actually send currency to the child, such as during an emergency, or allow the child access to a "members only" facility such as the parent's recreation or fitness center. Embodiments of the present invention also provide for logging recognition events to thereby track the presentation/usage of identification data geographically and with a timestamp. Embodiments of the present invention also allow for the creation and/or assignment of multiple IDs to be associated with each set of personal data of a different user. Embodiments of the present invention also provide for using a combination of the subscriber identity module (SIM) ID number of the ID instrument, registered-electronic signature of the various electrical components of the ID instrument, or other digitized firmware or data unique to the specific ID instrument as access identification to the set of personal data of the respective different user.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 2 is a layout of the conventional ISO track diagram;

FIGS. 3, 4, and 5 are more detailed descriptions of the track layout under a standard ISO-8711 standard; and FIG. 6 is a transaction flow chart of a process for associating identification and personal data in accordance with an embodiment of the present invention;

FIG. 8 is a schematic block diagram of a system to provide a customized set of identification data to facilitate a transaction according to an embodiment of the present invention;

FIG. 9 is a schematic block diagram of an ID instrument to provide a customized set of identification data to facilitate a transaction according to an embodiment of the present invention.

DETAILED DESCRIPTION

The present invention will now be described more fully hereinafter with reference to the accompanying drawings, which illustrate embodiments of the invention. The present invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Figure 1:
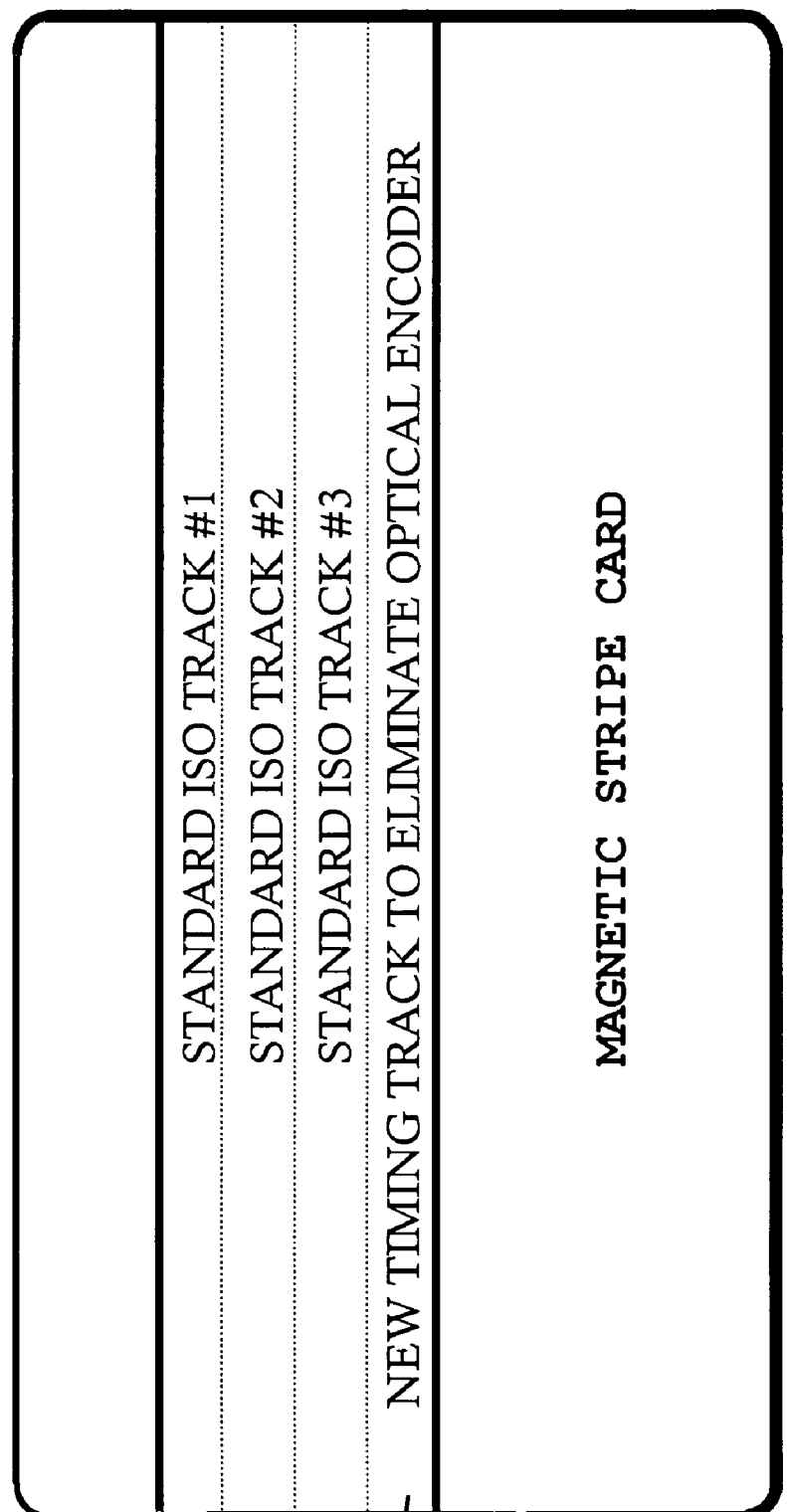
FIG. 1 is a track layout in accordance with one aspect of the present invention.

Applicant has discovered that there are many instances whereby an individual, consumer, entity, organization, etc. would find it desirable to provide others with a secure, customized set of identification data that would facilitate a transaction or event of a specific type. Using the basic principles of the present invention as described in the above referenced prior filed patent application of Applicant, the process is thus described. Referring first to the description and drawings of the above referenced patent issued to Applicant, it may be seen that FIG. 1 herein shows that an additional timing track 10 can be employed on a card 20 in an embodiment of the present invention which may be used to ameliorate the need of an optical encoder in a device such as the wallet consolidator discussed above or in other types of readers. This is provided in that most conventional magnetic stripe readers use a mechanical sensor or optical sensor which is used to detect the speed at which the magnetic stripe card is being read through the stripe reader. By having an additional timing track supplied as an additional track, the inventor herein has provided a means by which the reader can be made at a lower cost by using the timing track herein to determine the timing arrangement. However, this additional timing track 10 is not necessary for the operation of this embodiment of the present invention, and in fact, the conventional encoding and timing mechanism are quite satisfactory.

One of the significant features of an embodiment of the present invention is that multiple stripes from various credit cards can be read and consolidated onto one card as is set forth in the aforementioned wallet consolidator patent application. One of the unique features of this embodiment of the present invention is the ability to take foreign or other sources and to add that material onto a given track on the card. The wallet consolidator uses the individual memory chip or smart chip contained on a card to store information, however, this information can also be temporarily stored in the memory of a device such as the wallet consolidator and added to the magnetic stripe. One of the unique features of Applicant's invention is the use of the fact that a standard track of one card data format has an amount of information which is known as discretionary data which can be placed on any given card in any one of the standard three tracks. By using the control code to indicate the type of track is in a different format and using these control codes to "bracket" an individual stream of data and placing this after a standard stop sentinel on a data track, a conventional reader would inherently ignore the information contained within this section. However, a specially constructed reader/writer would be able to look for or create these special control codes or the software within the conventional reader could be altered so that upon recognition of these special control codes this additional information could be decoded. This allows for a "hiding" of additional information which can be consolidated onto a given card to be employed and used in a very expeditious manner. Further it will be understood that the sentinels described above need not be employed to practice this embodiment of the present invention and that other types of software codes can be used so that point-of-sale ("POS") and other point of transaction (POT) terminals, either as they exist today or with custom reprogramming, can be used to read the additional or foreign information that is to be "added" to conventional tracks. The start and stop sentinels have been described herein as only an example of the types of control codes that can be used to bracket the foreign data that is to be added to the card stripe. Further a control code could be programmed into the stripe that can be recognized by the POS/POT reader to indicate that this is, for example, a credit card, a second code could indicate that this is a discount or affinity card, and yet a third code could indicate that this is a drivers license. These codes could also be combined in various ways. Prior art systems have not used these special control codes to effectively hide additional data on a given track. This additional information can be used effectively.

Figure 4:
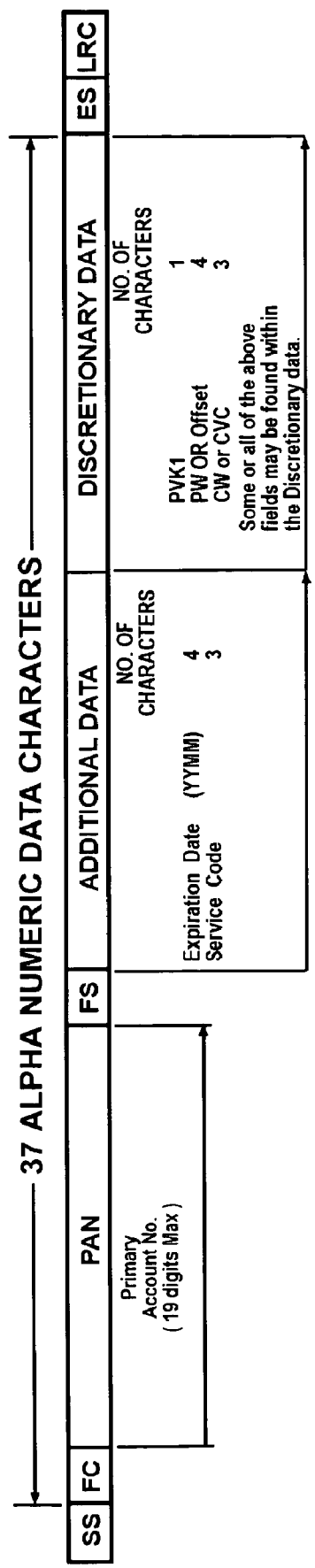

This can be made more clear when one reviews FIGS. 3, 4 and 5 which shows the significant amount of space that is available for "either discretionary data or additional data" on a given track. This is especially true when the 210 bpi track is used. The additional either alpha numeric or numeric characters provides a significant amount of space for additional data to be placed on a given card which has been unavailable in prior art systems. Additionally, as the control code can be used to effectively to "shift" the track concentration from 75 to 210 bpi, in the middle of the track additional information can be "hidden" and still be provided to a specially outfitted or programmed reader. Accordingly, additional data can be used and be present on a card which would not be generally readable without the proper equipment or programming.

Referring now to FIG. 6, there is shown a transaction flow chart of a process for associating identification and personal data utilizing the system described above with regard to FIGS. 1-5. As stated above, there are many instances whereby an individual, consumer, entity, organization, etc., would find it desirable to provide others with a secure, customized set of identification (ID) data that would facilitate a transaction and or event of a specific type. Additionally, the receiver of the data for the transaction may wish to provide complimenting and supplemental data back to the originator of the transaction and all such transactions being done in a digitized format to be interpreted, manipulated and/or displayed on POS/POT devices/computers both at the POS/POT and remotely. Additionally, the process of initializing this secure transaction would be more flexible if the acceptors of the transaction could utilize a magnetic stripe card that could combine a unique identifying code with the standard ISO data from other completely different financial or other card's magnetically striped data.

FIG. 6 visually illustrates an example of such a transaction as follows:

Individual A would transmit via computer/communication line, his or her personal data, to a remote computer, e.g., server 31. In this case a downloaded or scanned personal image, a downloaded or read driver's license from a public authority, checking account number, credit card, debit card from a financial institution, and supermarket frequent purchaser card.

Through server prompted instructions, the individual would be asked to select a password to protect his data, then further prompts could permit him to associate, if he so desired, certain ID and/or purchasing (credit/debit/checking account) data with particular transaction types, merchants, etc. In this example individual A could link the image, drivers license, checking account data and frequent purchaser card data with transactions driven by, for example, a supermarket with which individual A holds the frequent purchaser card.

When shopping at the supermarket chain, individual A could present a magnetically striped card, smartcard, or radio frequency or infrared PDA transmitted personal ID number. The store POS 41 would read the data, communicate ultimately with the central server 31, and retrieve the customized transaction data including the image of the purchaser, which could be displayed on the store POS screen; and the purchase would be confirmed with buyer and seller.

The supermarket can transmit the purchase data back to the central server 31 including, as an example, an electronic coupon(s) for future purchases. The supermarket can be empowered by the individual to also transmit at any time to the server 31 other coupons, discounts offers and or communications which could be read via the Internet or POS/POT and/or redeemed by the customer for future purposes. The supermarket can also receive and process changes, updates, and additions with respect to the supermarket frequent purchaser card and/or those from other service providers 39. The system could be expanded to include, by way of examples, membership ID's admittance, hospital, medical insurance, event ticketing, and/or money transfer type transactions. In this fashion, an individual and/or entity could minimize portability issues and facilitate complex identification needs such as biometrics, imaging, and fingerprint technologies.

Figure 7:
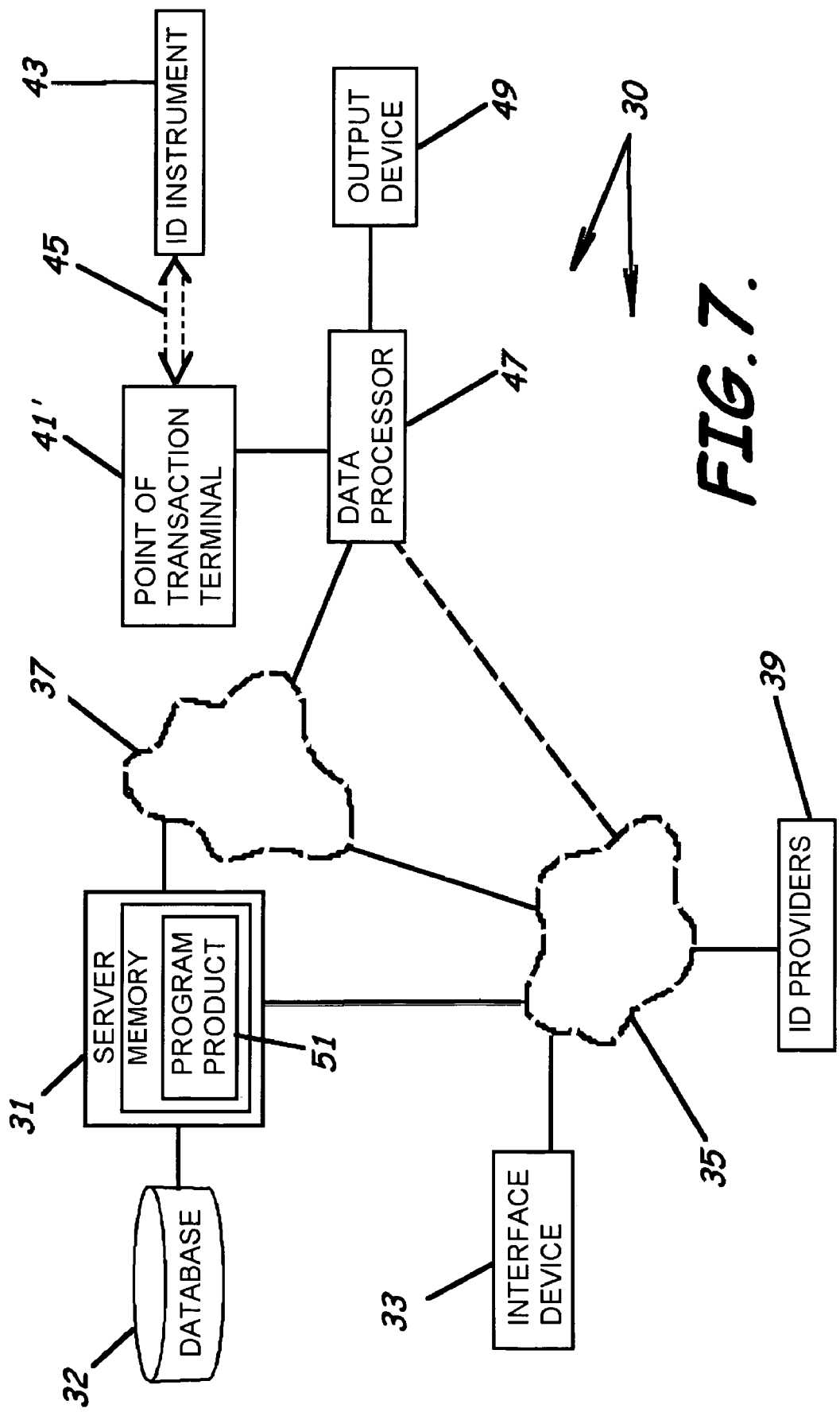
FIG. 7 is a schematic block diagram of a system to provide a customized set of identification data to facilitate a transaction according to an embodiment of the present invention.

As shown in FIGS. 6, 7 and 8, an embodiment of the present invention includes a retail and/or other point of transaction system 30 to provide others with a secure, customized set of identification data that would facilitate a transaction or event of a specific type, such as, for example, that related to goods, services, grocery items, food, medical services and supplies, insurance premiums, ticketing, a money transfer, and identification services relating to a person/customer. The system 30 can include a computer, e.g., server 31, configured to store a plurality of personal control IDs and a plurality of sets of personal data associated therewith. A database 32 in communication with the server 31 can provide for such storage. Note, the server 31 shown schematically, for example, in FIGS. 6, 7 and 8 represents a server or server cluster or server farm and is not limited to any individual physical server or computer. The number of servers along with associated storage capacity and their architecture and configuration may be increased based on usage, demand, and capacity requirements for the system 30.

The personal data can include, for example, a personal name, a personal ID to be associated with the personal data, a pictorial image of the person, personal fingerprint data, personal checking account data, driver's license data of the person, personal biometric data, a personal social security number, a personal ID password, a personal data password, credit card data, debit card data, prepaid card data, frequent purchaser data, medical data, bank account data, investment data, coupon data, processed data, points, data based on existing personal data generated in response to a previous transaction, and membership ID. This personal data can also be received from an ID provider 39 associated with the user such as, for example, a public authority, financial institution, or retail establishment management center; received from the user who received it from the ID provider 39; received directly from the user; or created internally by the administrator or maintainer of the server 31.

Each of the plurality of personal control IDs can be associated with a respective different person and the respective set of personal data entered into the server 31 and controlled by the respective different person, e.g., via a user interface device 33 or ID instrument 43, such as, for example, a personal computer, personal digital assistant (PDA), cellular telephone, or other user communication device, that is in communication with a computer and/or communication network 35, e.g., the Internet, wireless, or wireline communication medium, or via a point of transaction connected to either the network 35 or a local area network 37 interfaced with the network 35 and/or server 31.

The server 31 is also configured to store a data profile derived from a set of personal data associated with a personal control ID identifying a selected different person and assembled together by the selected different person for use by a selected one of one or more ID providers 39 identified by a provider ID. The provider ID can be used to identify a selected ID provider 39 to the server 31 to allow access thereto. Note, as perhaps best shown in FIGS. 8 and 10, the ID providers 39 including card/ID issuers can provide to the server 31 identification data, credit and debit card data, biometric data, and other changes, additions, and updates thereto through network 35 (FIGS. 7 and 8). The server 31 can be configured to receive and process such changes, updates, and additions to components of data profiles/sets of personal data provided by the providers/issuers. This digitized data can be in POS/POT ready format when delivered to the server 31 or can be formatted after receipt so that when received by the user, e.g., downloaded via a computer, PDA, or cellular phone, the data is properly formatted to be received and processed by a POS/POT terminal 41, 41', described in more detail below. After processing the changes, updates, and/or additions, the server 31 can then provide the data to the respective user. Processing can include the user accessing and/or modifying the data profile in response to the changes, updates, and/or additions. The data can be delivered over the network 35 and through an interface device 33 to the user's ID instrument 43 as shown, for example, in FIG. 7; directly to the ID instrument 43 if configured to interface with the network 35 as shown, for example, in FIG. 8; and/or through a radiofrequency server 61 for ID instruments 43 configured to receive radio transmissions as shown, for example, in FIG. 10.

According to an embodiment of the present invention, as perhaps best shown in FIG. 6, the ID providers 39 can also directly provide to the individual users: identification data, credit and debit card data, biometric data, and changes, additions, and updates thereto. Such data can be provided to the users, for example, directly through the network 35 to their respective ID instrument 43 or directly via a user interface device 33. When provided directly to either the ID instrument 43 or interface device 33, the data should be in digitized, POS/POT ready form so that when stored by an ID instrument 43, the data is formatted to be readily accessed and processed by the POS/POT terminal 41, 41'.

In order to derive the data profile, according to an embodiment of the system 30, a user having a personal ID and password accesses the server 31 through the interface device 33, e.g., personal computer, PDA, or kiosk terminal, etc., or ID instrument 43 connected to a network 35, e.g., a wide area network including the Internet. The server 31, for example, through a graphical user interface, can present the user an ability to allow (assign) individual ID providers 39 selective access to the user's other personal data, typically required by the respective ID provider 39 for identification or authentication purposes. The server 31 can also provide the user the ability to assign or cross-link other ID provider data, e.g. credit or debit card credentials. Such assignment allows such additional credentials not stored on the ID instrument 43 to be displayed upon access to and authentication by the server 31 through use of a personal ID or other stored credentials at a point of sale or other point of transaction in accordance with the data profile, as described previously and as described in more detail later. Such assignment can include details about each of the ID providers 39 including the provider name, location, and a date and time the provider associated credentials are to be activated or deactivated, and/or whether or not additional password or security data is required. The server 31 can also generate virtual credentials based on associations between the user and one or more ID providers 39, and between ID providers 39 including the administrator of the server 31 which can also be an ID provider 39.

According to an embodiment of the server 31, such cross-linking can allow access to the personal data in accordance with the data profile using the different credentials provided by different ID providers 39. For example, a vendor membership card in possession of the user previously configured as part of the user's personal data can allow access by a vendor to other personal data identified in accordance with a data profile such as, for example, an image of the user, driver's license number, credit or debit card number, or other form of identification, which can be used to allow access to vender peripheral devices such as, for example, a gate, security door, turnstile, gas pump lock, computer lock, ignition lock, and others known to those skilled in the art. Beneficially, this can allow a single identification device cross-linked to credentials otherwise contained on other devices or ID instruments 43 to allow the user access to physical facilities such as, for example, sporting events, secure facilities, prison or hospital visitor admittance, hospital nurseries, employee only portions of the facility, ATM devices, self-service devices requiring identification, just to name a few. This can also allow the user access to virtual facilities such as, for example, access to multiple credit or debit card accounts issued by different ID providers 39 through use of a single issued credit or debit card or even a member, employee or student ID, or driver's license, or other ID instrument 43.

The system 30 can also include multiple terminals, e.g., point-of-sale (POS) terminals 41 or other point of transaction (POT) terminals 41' (see FIGS. 6-8), adapted or otherwise positioned to couple to an ID instrument 43 via a data communication link 45, e.g., a wireless link, a wireline link, wide area network (WAN) link, an infrared (IR) link, a radio-frequency (RF) link, an optical link, or a magnetic link, to receive from the ID instrument 43 the personal control ID identifying the selected different person. The POS/POT terminals 41, 41' can be also positioned to send the personal control ID identifying the selected different person to the server 31, for example, through or via a data processor 47 which can be configured to transmit transaction ID information containing information needed to execute the transaction, the personal control ID identifying the selected different person, and the provider ID which can be used to identify a selected ID provider 39.

The POS/POT terminals 41, 41' (FIGS. 6, 7, 8, and 10) can include, for example, a magnetic card reader, a smart card reader, a bar code reader, an infrared (IR) receiver, an optical scanner, a transmitter adapted for transmitting a pre-determined signal for activating a response from an RF identification (RFID) tag 57 (see, e.g., FIG. 9) and for receiving a response back from the RFID tag 57, and an interface adapted for receiving RF signals from at least one of a cell phone and an RF device. The ID instrument 43 can include a magnetically striped card, smartcard, a bar code, a gift card, an automatic teller machine (ATM) card, a check card, a wallet consolidator, a debit card, a credit card, a smart card, a prepaid card, a personal identification card, a driver's license, a personal computer (PC), a laptop computer, a personal digital assistant (PDA) adapted for radiofrequency (RF) or infrared (IR) communication, a check, a keypad, a touchscreen, a voice recognition device, a radio-frequency (RF) device including an RFID tag 57 such as a cell phone or other data communication device capable of storing and transmitting personal ID data. Note, the RFID tag 57 can function as an equivalent for the magnetic strip on various security, credit, debit, and/or gift cards, for example, but with added functionality including a larger storage capacity, faster access to the data, and generally no need for actual physical contact with an electronic reader, e.g., terminal 41, 41' or interface device 33.

The server 31 correspondingly can be further configured to retrieve from the plurality of sets of personal data the data profile derived from the set of personal data associated with the personal control ID identifying the selected different person in response to receiving the personal control ID, and to transmit to the data processor 47 or POS/POT terminal 41, 41' the data profile for use by the selected provider identified by the provider ID. Beneficially, this can be accomplished for a plurality of persons, providers, and transactions. For example, a user having at least one ID instrument 43 associated with the user's personal data and a member of the network of users associated with the server 31 arrives at a transaction site, e.g., convenience store gas pump, facility having a security gate, supermarket checkout counter, etc. The user then engages any one of the ID instruments 43 associated with the specific user in communication with the terminal 41, i.e., the user "swipes" the ID instrument 43 through a card reader portion of the terminal 41 if in the form of a magnetic card or passes the ID instrument 43 over a near field transmitter if in the form of a RFID tag, for example. Identification data, e.g., personal ID, read from the ID instrument 43 is passed through a data processor 47 to the server 31. The server 31 uses the credentials extracted from the ID instrument 43, looks up those credentials in the database 32, and identifies the user as a member of the network of users.

According to an embodiment of the present invention, the server 31 is configured to recognize that the personal control ID is being received prior to transmitting to the data processor 47 the data profile derived from the set of personal data associated with the personal control ID identifying the selected different person. The server 31 is also configured to provide the data profile to the selected provider to thereby verify the personal control ID as being associated with a use of the personal control ID prior to proceeding with the transaction. For example, if the transaction site is an unmanned facility having peripheral devices such as a security gate or gas pump, the indication that the user is a member can be provided to allow unlocking the peripheral device and/or allow for logging access to the peripheral device by the user. The log can include the name of the vendor, location, date, and time of the transaction, which can be maintained at the transaction site via the data processor 47 or can be maintained at the server site by the server 31. When maintained by the server 31, the user can be provided access via the interface device 33, e.g., personal computer or PDA, or a "smart" ID instrument 43 to allow monitoring of transactions under the user's personal ID or other credentials. Note, the log function applies to both unmanned and manned transactions. Note also, no transaction needs to take place in order for the server 31 to perform the log function. According to an embodiment of the system 30, only receipt of the personal ID or other user credentials by the server 31 is required.

Beneficially, such function can be applied to track access to portions of a self-service type facility to help reduce theft and/or to improve treatment of a facility, i.e., the user knows that the user is not anonymous but can be identified and held accountable for any damage. Such function can also be utilized with self-service devices to help reduce theft and improve treatment of the device. For example, traditionally many gas station convenience stores enable their gasoline pumps via visual contact with the customer but without obtaining actual identification that would be transferable to authorities should the customer fail to pay for the gasoline. A proprietary gas service card or the identification data contained therein can be provided to the user. Use of a card or other ID instrument 43 containing such identification data can be required in order to unlock the pump if a payment card is not to be used. Upon "swiping" the gas identification card or other ID instrument 43, the pump terminal 41 can transmit the ID credentials to a data processor 47 typically located in the convenience store which can request transaction confirmation from the server 31. The server 31 can perform the look-up of the credentials and identify the user as a member of the network of users. The data processor 47 can then enable access to the gasoline pump responsive to the confirmation. Depending upon the data profile and/or capability of the gasoline terminal 41, a preselected credit or debit card in the form of the associated transaction information contained therein can be displayed on output device 49, e.g., video terminal, and virtually accessed to pay for the gasoline, or currency or another payment card can be utilized. Further, the transaction can be logged and the user identification, provider location, and date and time, can be associated with the logged event.

This log function can also allow the owner of the personal ID to track authorized or unauthorized usage including tracking the name, location, and a date and time the provider or transaction terminal requested identification confirmation. Beneficially, this can allow for automated monitoring of related persons having an ID instrument 43 with access to the personal ID or other credentials of the user, and automated monitoring of the movement of pets or possessions carrying an ID instrument 43 containing the personal ID or other credentials of the user. Beneficially, portions of the log can be retrieved and e-mailed or otherwise transmitting to selected e-mail addresses, e.g., law-enforcement, medical provider, etc.

If the transaction site is a manned facility, in accordance with the data profile, the server 31 can return to a data processor 47 and/or output device 49 at the transaction site, e.g., video display, personal data associated with the user, e.g., a driver's license or other ID, photograph of the user, fingerprint of the user, and/or an indication that the user is a member associated with credentials necessary to access the transaction site. The transaction site operator can then view the user's driver's license and photograph prior to authorizing completion of the transaction. If the point of transaction is a point-of-sale, such as in this illustration, and if authorized in accordance with the data profile, associated payment credentials, e.g., credit or debit card information, can be displayed on the video display to allow easy selection of the payment method.

Traditionally ID instruments 43 have been almost exclusively in the form of cards having magnetic stripes. RFID technology, however, can provide for containment of substantially more information than could otherwise be carried by the traditional magnetic strips. According to an embodiment of the present invention, the ID instrument 43 can be in the form of a common hand-held electronic device already in use for other purposes. Accordingly the ID instrument 43, e.g., a cell phone, PDA, or other similar device, can include an RFID tag or circuit 57 (FIG. 9). A main transmitter of the device can be adapted to provide extremely short-range transmissions, or as shown in FIG. 9, a separate near field transmitter or transceiver circuit 55 can be positioned within or adjacent and coupled to the ID instrument main circuitry, e.g., processor 59, to communicate with the onboard or attached RFID tag/circuit 57 to read data from and/or write data to the RFID tag 57. This can provide for storing, adding, or updating personal data and/or portions of the data profile or other credentials to the ID instrument 43. As noted previously, the data can be initially received directly from an ID provider 39 (see, e.g., FIG. 6) or through the server 31 (see, e.g., FIGS. 6 and 10) in POS/POT ready form. Note, the data can be encrypted as known and understood by those skilled in the art when transmitted over a network 35, 37, to help ensure secure usage.

According to an embodiment of the ID instrument 43, the data can not only be accessed for use at a POS/POT terminal 41, 41', but also the data can be directly or indirectly accessed by the main ID instrument circuitry, e.g., cell phone processor 59-near field transceiver 55, and transmitted over a network 35 either directly or via one or more interface devices 33 to another user, e.g., family member or trusted individual. Such functionality allows the other user to utilize the personal data and/or portions of the data profile, e.g. personal ID and/or PIN number, credit or debit card balance, etc., using that respective user's ID instrument 43 at a POS/POT terminal 41, 41' to thereby complete a sale or transaction with a merchant or service provider associated with the POS/POT terminal 41, 41', and/or the ID provider 39, or with an associated service provider such as, for example, a separate financial institution, medical facility, security facility, etc. In yet another embodiment of the ID instrument 43, data such as the personal ID and pin number can be encrypted and transmitted over the network 35 directly or via one or more interface devices 33 to another user to allow the other user to access and retrieve at least a portion of the set of personal data and/or data profile from the server 31 to allow the other user to utilize the personal data and/or portions of the data profile using that respective user's ID instrument 43 at a POS/POT terminal 41, 41'. In either of these embodiments, rather than transfer data directly from the ID instrument 43, the data can be provided to the interface device 33, e.g., PDA or personal computer, if not already located thereon and transferred accordingly.

The system 30 can also include an output device 49 connected to or otherwise in communication with data processor 47 and/or point of transaction terminal 41' to receive from the data processor 47 the data profile received from the server 31 and to output the data profile to the selected provider to thereby verify the personal control ID as being associated with a user of the personal control ID at the point of transaction prior to proceeding with the transaction. The output device 49 can be further configured for generating information relating to the selected person in response to receipt of personal data associated with the selected personal ID for the purposes of facilitating the transaction and facilitating the generation of transactional data and other customer messages via the Internet or point of transaction. According to an embodiment of the present invention, output device 49 is configured to generate incentives for making future purchases to the selected person in response to receipt of personal data related to the selected personal ID. The incentives can include, for example, a coupon and/or a discount offer, and the output device 49 can include, for example, a visual display monitor and a printer. Note, according to an embodiment of the present invention, the data processor 47, POS/POT terminal 41, 41', and the output device 49 can be integrated together to constitute a substantially integrated input/output device.

Embodiments of the present invention include methods of using the system 30 to include providing a customized set of identification data to facilitate a transaction. For example, a method can include first preparing the system 30 to facilitate transactions by first receiving a set of personal data of a user, requesting and/or receiving a personal ID from the user to associate with the set of personal data, and storing the personal ID and set of personal data in a database 32 in communication with a remote computer server 31. The user can access the set of personal data over the network 35, e.g., Internet, and derive a data profile using an interface devices 33, e.g., a personal computer or PDA, or using the ID instrument 43 depending upon the configuration, i.e., if capable of such communication. The data profile can restrict a particular ID provider to only user credentials provided by that ID provider or can allow access to user credentials from a plurality of ID providers. After receiving or loading an ID instrument with personal ID and/or transaction data, the user may then visit a point-of-sale 41 or other point of transaction 41' for purposes of conducting a transaction. As such, the method can include acquiring the personal ID of the user from an ID instrument 43, submitting a request to the server 31 for at least a portion of the set of personal data of the user along with both the personal ID of the user and provider ID, and providing customized information based on a data profile derived from the set of personal data of the user for use by the provider identified by the provider ID to identify the user. If the POS/POT terminal is associated with a peripheral device, i.e., a switch controlling hardware necessary to complete the transaction, the steps can include manipulating the associated peripheral device in response to receipt of the customized data.

Figure 10:
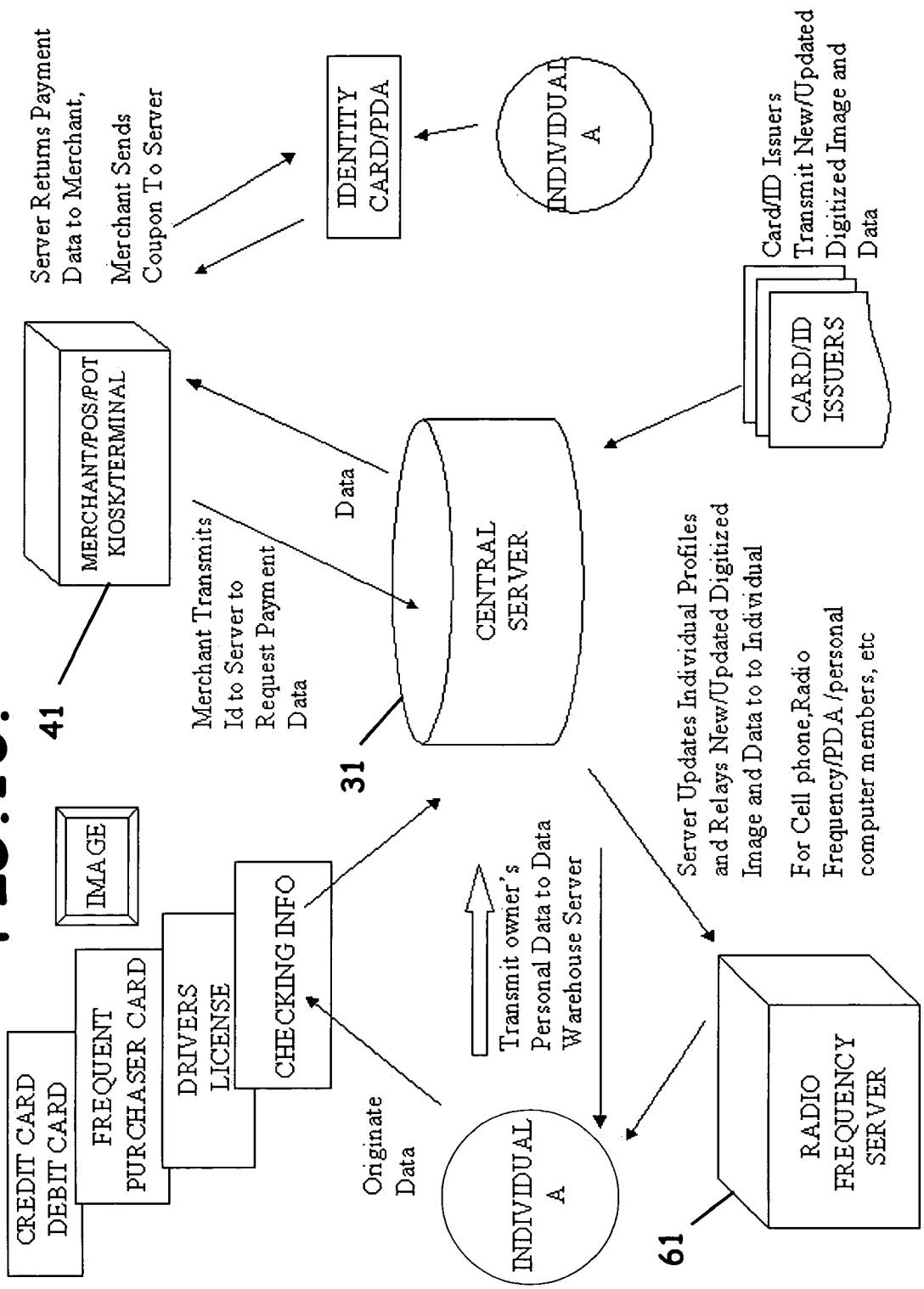
FIG. 10 is a transaction flow chart of a process for receiving and forwarding identification and personal data according to an embodiment of the present invention.

As shown in FIGS. 6-9, an embodiment of the method can include an ID provider 39 providing personal data and/or a portion of the personal data or data profile including, for example, an account number, expiration date, and/or pin number for a debit or credit card or bank account, security identification number for a security badge, medical information, biometric information and/or other access credentials either directly to a user ID instrument 43 or via user interface devices 33 through network 35, for example, in digitized, POS/POT ready form. Alternatively and/or additionally, as shown in FIG. 10, the access credentials can be provided to a computer, e.g., server 31, for later access and/or downloading by the user. Beneficially, if the access credentials are not already in POS/POT ready form, the server 31 can convert the data into such form prior to the accessing and/or downloading by the user, e.g., owner of the credentials. Once stored in ID instrument 43 in digitized, POS/POT ready form, the data can be readily used at a POS/POT terminal 41, 41', by the user. Additionally, the data can be forwarded to another ID instrument 43, such as, for example, one in the possession of another user, e.g., family or trusted member, for use at a POS/POT terminal 41, 41' by the other user.

According to embodiment of the method, the forwarding can be either directly from the ID instrument 43 or via an associated interface device 33. Beneficially, such methodology negates the need for transferring individual identification instruments such as, for example, credit, debit, gift, or coupon cards, etc., but instead allows for the receipt of data otherwise stored on such cards. In another embodiment of the method, if not already stored on the server 31, the owner of the credentials can transmit the credentials or other personal data to the server 31 for access by another user. In this embodiment of the method, only basic server 31 access data need be transmitted to the other user to allow the other user to access portions of the personal data, data profile, or other credentials from the server 31. Such methodology can allow for electronically transferring funds or credit between users, negating any need for actual currency transfer or even an actual point-to-point connection between users.

An embodiment of the method can include providing incentives to the user for making future purchases in response to receipt of personal data related to the personal ID and/or a transaction between the user and a merchant. The incentives can include, for example, a coupon or a discount offer. Such incentives can be associated with the personal data of the user. Changes, updates, and additions from providers of components of data profiles can be received and processed.

Embodiments of the present invention also include a program product 51 stored in memory of the server 31 and adapted to provide identification data to facilitate a transaction. The program product 51 can include instructions to perform the operations of receiving a set of personal data from a remotely positioned user, requesting and receiving a personal ID from the user to associate with the set of personal data, and storing the personal ID and set of personal data in a database 32 in communication with the server 31. The operations can also include receiving user access credentials either directly or indirectly from an ID provider 39, and associating the credentials with a provider ID and a personal ID. If the set of personal data, components of a data profile, or newly added, changed, or updated components or other credentials are not already in POS/POT ready form, server 31 can convert the data into such form prior to transmitting the data to the user, e.g., owner of the credentials. The operations can also include deriving a data profile from the set of personal data of the user for use by an ID provider 39, e.g., and a point of transaction. This can include associating components of the data profile derived from a plurality of ID providers, e.g., multiple credit card providers, with components provided by a single credit card provider. The operations can also include creating virtual credentials or other personal data based on associations between the user and one or more ID providers 39 and between ID providers 39 including the administrator of the server 31 which can also be an ID provider 39.

The operations can also include receiving a request from a point of transaction terminal or associated data processor for at least a portion of the set of personal data of the user along with both the personal ID of the user and a provider ID, and providing customized information based on a data profile derived from the set of personal data of the user for use by the provider identified by the provider ID. Note, the memory of the server 31 can include volatile and nonvolatile memory known to those skilled in the art including, for example, RAM, ROM, and magnetic or optical disks, just to name a few. Note also, the program product 51 can be in the form of microcode, programs, routines, and symbolic languages that provide a specific set for sets of ordered operations that control the functioning of the hardware and direct its operation, as known and understood by those skilled in the art.

Embodiments of the present invention also include a program product 53 stored in memory of an electronic form ID instrument 43, e.g., PDA or cell phone, or interface devices 33, e.g., PDA or personal computer, adapted to provide identification data to facilitate a transaction. The program product 53 can include instructions to perform the operations of receiving a set of data from a remotely positioned ID provider 39, for example, an account number, expiration date, and/or pin number for a debit or credit card or bank account, security identification number for a security badge, medical information, biometric information and/or other credentials, for example, in digitized, POS/POT ready form, either directly through a terminal associated with the ID provider 39 or through a communication network, e.g., network 35. Alternatively and/or additionally, the instructions can include those to perform the operation of retrieving/download the credentials from a computer, e.g., server 31, having previously received such credentials from the ID provider 39 or from the user.

The instructions can also include those to perform the operations of causing the credentials to be transmitted from a first memory element within the ID instrument 43 to a second memory element, e.g., RFID tag 57. Once stored in ID instrument 43 in digitized, POS/POT ready form, the data including the newly received credentials and other personal data and/or data profile can be readily used at a POS/POT terminal 41, 41', by the user or forwarded to another ID instrument 43 or interface device 33, such as, for example, one in the possession of another user, e.g., family or trusted member, for use at a POS/POT terminal 41, 41,' by the other user. That is, the instructions can also include those to perform the operation of transmitting or otherwise forwarding the credentials to another ID instrument 43 or interface device 33.

According to an embodiment of the program product 53, the instructions can include those to perform the operation of transmitting the newly acquired credentials or other personal data directly to the other ID instrument 43 over a communication network, e.g., network 35. In another embodiment of the program product 53, the instructions can include those to perform the operation of transmitting the newly acquired credentials or other personal data to the server 31 for access by another user, if not already stored on the server 31. The instructions can also include those to perform the operation of transmitting basic server access data to the other user directly or through the server 31 to allow the other user to access the data from the server 31.

According to another embodiment of the system 30, rather than utilize or solely utilize a user selected or ID provider provided personal ID, "smart" ID instruments 43, e.g., cell phones, PDAs, etc., can utilize other data components of the data profile to validate the user's identity for permission to access the data profile or can utilize a simple non-access identity in combination with device carried credentials, e.g., for off-line transaction purposes. For example, such device carried credentials can include: a subscriber identity module (SIM) ID number present in the SIM card the smart device and/or embedded in the firmware of the smart device; registered electronic signatures of the various electronic components of the circuits utilized by the model of the smart device, e.g., the manufacturer ID, make, model and serial number; and other digitized firmware and data that are unique to the specific smart device possessed by the owner of the data profile.

It is important to note that while embodiments of the present invention have been described in the context of a fully functional system, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links.

According to an embodiment of the present invention, a computer readable medium that is readable by a computer, e.g., server 31, providing identification data to facilitate a transaction can include a set of instructions that, when executed by the server 31, cause the server 31 to perform the operations of receiving a set of personal data from a remotely positioned user, requesting and receiving a personal ID from the user to associate with the set of personal data, and storing the personal ID and set of personal data in a database 32 in communication with the server 31. The operations can also include receiving from a point-of-sale 41 or other point of transaction terminal 41', or associated data processor 47, a request for at least a portion of the set of personal data of the user along with both the personal ID of the user and a provider ID, and providing customized information based on a data profile derived from the set of personal data of the user for use by the provider identified by the provider ID, for example, in identifying the user, verifying the identity of the user, and supplementing additional transactional information beyond that stored on the ID instrument, just to name a few. According to an embodiment of the present invention, instructions can also include those to perform the operations of providing incentives to the user for making future purchases in response to receipt of personal data related to the personal ID and/or a transaction between the user and a merchant, and receiving and processing changes, updates, and additions from providers of components of data profiles.

According to an embodiment of the present invention, a computer readable medium that is readable by at least one processor, e.g., that associated with server 31, ID provider 39, and/or one or more ID instrument processors 59, can include a set of instructions that, when executed by the at least one processor, cause the at least one processor to perform the operations of providing credentials to a first user by an ID provider 39 and storing the credentials in the memory of a first ID instrument 43. The credentials can include, for example, an account number, expiration date, pin number for a debit card, pin number for a credit card, pin number for a bank account, security identification number for a security badge, and biometric information. According to an embodiment of the present invention, the credentials can be provided directly to the first ID instrument 43 through a communication network, e.g., network 35, 37, in digitized, point-of-sale or point of transaction ready form. According to another embodiment of the present invention, the credentials are first provided to a computer, e.g., server 31, for later access by the first user. If the credentials are not in point-of-sale or other point of transaction ready form, the server 31 can convert the credentials thereto prior to the accessing by the first user. The instructions can also include those to perform the operation of making the data available to the user to allow the user to form data profile indicating provider access attributes. This can include associating user credentials from a plurality of ID providers 39, i.e., portions of the set of personal data, with user credentials provided by a single ID provider 39 to allow access of components of the data profile attributable to the plurality of ID providers 39 using a single ID instrument 43 associated with one of the ID providers 39.

According to an embodiment of the present invention, the instructions can include those to perform the operation of forwarding the credentials from the first ID instrument 43 to a second ID instrument 43 in the possession of a second user to thereby allow for receipt of data otherwise stored on the first ID instrument 43. The operation of forwarding can include transmitting the credentials or other personal data by the first user via the first ID instrument 43 to the second user via the second ID instrument 43 and/or interface device 33. According to another embodiment of the present invention, the operation of forwarding can include transmitting the credentials or other personal data by the first user to a computer, e.g., server 31, for access by the second user. Alternatively, the operation of forwarding can include transmitting only basic access data to the second user to allow the second user to access the data from the computer. In either methodology, the credentials or other personal data can be transmitted to the second user to allow the second user to access electronic currency associated with the first user, to thereby transfer electronic currency between the first and the second users, negating any need for actual currency transfer.

This Application is related to U.S. patent application Ser. No. 11/130,765, filed on May 17, 2005, U.S. patent application Ser. No. 10/052,405, filed Jan. 17, 2002, now U.S. Pat. No. 6,938,821, U.S. patent application Ser. No. 09/664,205, filed on Sep. 18, 2000, now U.S. Pat. No. 6,402,029, U.S. patent application Ser. No. 09/618,407, filed on Jul. 18, 2000, now U.S. Pat. No. 6,293,462, and U.S. application Ser. No. 09/087,193, filed on May 29, 1998, now U.S. Pat. No. 6,131,811, all incorporated herein by reference in their entirety.

In the drawings and specification, there have been disclosed a typical preferred embodiment of the invention, and although specific terms are employed, the terms are used in a descriptive sense only and not for purposes of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification. For example, the system and methods were described with respect to point-of-sale or other point of transaction terminals in concert with an ID instrument possessed by a user. Such system, however, can be applied to inanimate objects or animals. For example, the ID instrument can be connected to an article of clothing, personal articles or belongings being worn or carried, baggage, or an article being shipped, to allow such item to be properly directed or allow entry thereof. Also, for example, the ID instrument can be implanted in or carried by an animal to allow access through, e.g., a "doggie door" or other restricted access medium.

The invention claimed is:

1. A system comprising:
a server configured to store a plurality of personal control IDs and a plurality of sets of personal data, each of the plurality of personal control IDs being associated with a respective different person and a respective set of personal data entered into the server and controlled by the respective different person and configured to store a data profile derived from a set of personal data associated with a personal control ID identifying a selected different person and assembled together by the selected different person for use by a selected one of one or more providers identified by a respective provider ID;
a data processor remote from and in communication with the server; and
a terminal in communication with the data processor and adapted to couple to an ID instrument via a data communication link to receive from the ID instrument the personal control ID identifying the selected different person and to send the personal control ID identifying the selected different person to the data processor, the data processor being configured to transmit to the server the personal control ID identifying the selected different person and the provider ID identifying the selected provider, the server being further configured to retrieve from the plurality of sets of personal data the data profile derived from the set of personal data associated with the personal control ID identifying the selected different person and to transmit to the data processor the data profile for use by the selected provider identified by the provider ID.

2. A system as defined in claim 1,
wherein the system comprises at least one of the following: a retail system and a point of transaction system; and
wherein the server is further configured to recognize that the personal control ID is being received prior to transmitting to the data processor the data profile derived from the set of personal data associated with the personal control ID identifying the selected different person;
wherein the respective set of personal data entered into the server is characterized by being controlled by the respective different person via the Internet or via a point of transaction;
wherein the terminal is positioned at at least one of the following locations: a point-of-sale and the point of transaction; and wherein the system further comprises an output device connected to the data processor to receive from the data processor the data profile received from the server and to output the data profile to the selected provider to thereby verify the personal control ID as being associated with a user of the personal control ID at the point-of-sale or point of transaction prior to proceeding with a transaction.

3. A system as defined in claim 2, wherein the ID instrument comprises at least one of the following: a magnetic striped card, a smart card, a bar code, a gift card, an automatic teller machine (ATM) card, a check card, a wallet consolidator, a debit card, a credit card, a smart card, a prepaid card, a personal identification card, a driver's license, a personal computer (PC), a laptop computer, a personal digital assistant (PDA) adapted for infrared (IR) communication, a check, a keypad, a touchscreen, a voice recognition device, and a radio-frequency (RF) device, the RF device comprising at least one of the following: a PDA adapted for RF communication, an RF identification (RFID) tag, and a cell phone; and wherein the personal data comprises at least one of the following: a personal name, a personal ID, a pictorial image of the person, personal fingerprint data, personal checking account data, driver's license data of the person, personal biometric data, a personal social security number, a personal ID password, a personal data password, credit card data, debit card data, prepaid card data, frequent purchaser data, medical data, bank account data, investment data, coupon data, processed data, points, data generated based on existing personal data responsive to a previous transaction, and membership ID data of the selected different person.

4. A system as defined in claim 3, wherein the output device is configured for generating in response to receipt of personal data related to the selected personal ID incentives to the selected person for making future purchases, the incentives including at least one of the following: a coupon and a discount offer; and wherein the server is further configured to receive and process changes, updates, and additions defining updated credentials in digitized point-of-sale and point of transaction ready form from providers of components of data profiles, and to distribute electronically the updated credentials.

5. A system as defined in claim 2, wherein the data processor, the terminal, and the output device are integrated together to constitute a substantially integrated input/output device.

6. A system as defined in claim 2, wherein the terminal comprises at least one of the following: a magnetic card reader, a smart card reader, a bar code reader, an infrared (IR) receiver, an optical scanner, a transmitter adapted for transmitting a predetermined signal for activating a response from an RFID tag and for receiving a response back from the RFID tag, and an interface adapted for receiving RF signals from at least one of a cell phone and an RF device; and wherein the data communication link comprises at least one of the following: a wireless link, a wireline link, wide area network (WAN) link, an infrared (IR) link, a radio-frequency (RF) link, an optical link, and a magnetic link.

7. A system as defined in claim 2, wherein the system includes a database for storing the sets of personal data;

wherein the terminal is a retail point-of sale terminal;

wherein the output device comprises at least one of the following: a visual display monitor and a printer;

wherein the server is further coupled to receive transaction ID information from the data processor, the transaction ID information having information relating to the transaction to be executed including the type of information needed to execute the transaction and personal ID;

wherein the server is configured to access the database to retrieve and process the set of personal data related to the personal ID and is restricted according to the transaction ID information; and wherein the data profile is usable in a transaction for at least one of the following: goods, services, grocery items, food, medical services and supplies, insurance premiums, ticketing, a money transfer, and identification services relating to the person.

8. A system as defined in claim 2, wherein the system includes a database for storing the sets of personal data;

wherein the server is configured to receive the personal ID and to access the database to retrieve and process personal data related to the personal control ID for each of a plurality of persons, providers, and transactions; and wherein the output device is further configured for generating, in response to receipt of personal data associated with the selected personal ID, information relating to the selected person for purposes of facilitating the transaction and facilitating the generation of transactional data and other customer messages via the Internet or via the point of transaction.

9. A system as defined in claim 1, wherein the ID instrument is a first ID instrument associated with a first user, and wherein the system further includes a second ID instrument associated with a second user, the first ID instrument adapted to receive the personal control ID directly from the selected one or more providers or indirectly from the server and adapted to transmit the personal control ID to the second ID instrument device associated with a selected second user to thereby allow the second user to use the personal control ID at the terminal.

10. A system as defined in claim 1, wherein the ID instrument is a first ID instrument associated with a first user, wherein the system further includes a second ID instrument associated with a second user, the first ID instrument adapted to receive the personal control ID directly from the selected one or more providers or indirectly from the server and adapted to transmit the personal control ID to the second ID instrument device associated with a selected second user, and wherein the second ID instrument is adapted to retrieve at least a portion of the personal data or data profile defining credentials from the server responsive to the personal control ID to thereby allow the second user to use the credentials at the terminal.

11. A system comprising:

a terminal adapted to couple to an ID instrument via a data communication link to receive from the ID instrument a personal control ID identifying a selected different person and to send the personal control ID identifying the selected different person;

a computer configured to store a plurality of personal control IDs and a plurality of sets of personal data entered into the computer and controlled by each respective different person, configured to store a data profile derived from a set of personal data associated with the personal control ID identifying the selected different person and assembled together by the selected different person for use by a selected one of one or more providers identified by a provider ID, configured to retrieve from the plurality of sets of personal data the data profile derived from the set of personal data associated with the personal control ID identifying the selected different person, and configured to send the data profile for use by the selected provider identified by the provider ID; and an output device configured to receive at least a portion of the data profile sent from the computer and to output the data profile to the selected provider to thereby verify the personal control ID as being associated with a user of the personal control ID at the point of transaction prior to proceeding with a transaction.

12. A system as defined in claim 11,
wherein the plurality of sets of personal data entered into the computer is characterized by being controlled by the respective different person via the Internet and via a point of transaction; and
wherein the personal data comprises at least one of the following: a personal name, a personal ID, a pictorial image of the person, personal fingerprint data, personal checking account data, driver's license data of the person, personal biometric data, a personal social security number, a personal ID password, a personal data password, credit card data, debit card data, prepaid card data, frequent purchaser data, medical data, bank account data, investment data, coupon data, processed data, points, data generated based on existing personal data responsive to a previous transaction, and membership ID data of the person.

13. A system as defined in claim 11,
wherein the output device is further configured for generating to the selected person, in response to receipt of personal data associated with the selected personal ID, at least one of the following: information relating to the selected person for purposes of facilitating the transaction and facilitating the generation of transactional data and other customer messages via the Internet or via the point of transaction, and incentives for making future purchases including at least one of following: a coupon and a discount offer; and
wherein the computer is further configured to receive and process changes, updates, and additions from providers of components of data profiles in digitized point-of-sale and point of transaction ready form and to provide the changes, updates, and additions to the selected person responsive to the processing.

14. A method for providing a customized set of identification data to facilitate a transaction, the method comprising the steps of:
acquiring a personal ID of a user form an ID instrument;
submitting a request to a computer for at least a portion of a set of personal data of the user along with both the personal ID of the user and a provider ID of a provider;
providing customized data for use by the provider identified by the provider ID to identify the user, the customized data begin based on a data profile derived from the set of personal data of the user;
receiving a set of personal data from the user;
receiving the personal ID from the user to associate with the set of personal data;

deriving the data profile from the set of personal data of the user for use by the provider identified by the provider ID responsive to the personal ID and the provider ID to thereby provide customized data to the provider identified by the provider ID;
generating a coupon or discount offer defining an incentive to the user for making future purchases responsive to a transaction between the user and a merchant; and
associating the incentive with the personal data of the user.

15. A method as defined in claim 14, further comprising the steps of:
storing the personal ID and the set of personal data in a database; and
loading an ID instrument with the personal ID and transaction data.

16. A method as defined in claim 14, further comprising the steps of:
receiving and processing changes, updates, and additions from providers of components of data profiles; and
providing the changes, updates, and additions to the user responsive to the processing.

17. A method for providing a customized set of identification data to facilitate a transaction, the method comprising the steps of:
providing credentials to a first user by an ID provider, the step of providing including providing credentials to a computer for later access by the first user and converting the data into point-of-sale or point of transaction ready form prior to the accessing by the first user;
storing the credentials in the memory of a first ID instrument in possession of the first user; and
forwarding the credentials from the first user over a communication network to a second ID instrument in the possession of a second user to thereby enable for use by the second user transaction data accessible to the first ID instrument.

18. A method as defined in claim 17, wherein the credentials can include at least one of the following: an account number, expiration date, pin number for a debit card, pin number for a credit card, pin number for a bank account, security identification number for a security badge, and biometric information.

19. A method as defined in claim 17, wherein the first user is the owner of the credentials, and wherein the credentials are provided through a communication network to the second ID instrument in digitized, point-of sale or point of transaction ready form.

20. A method as defined in claim 17, wherein the first user is the owner of the credentials, and wherein the step of forwarding includes the first user transmitting the credentials to a computer for access by a second user.

21. A method as defined in claim 17, wherein the first user is the owner of the credentials, and wherein the step of forwarding includes transmitting data to the second user to allow the second user to access electronic currency associated with the first user, to thereby transfer electronic currency between the first and the second users, negating any need for actual currency transfer.

22. A method for providing a customized set of identification data to facilitate a transaction, the method comprising:
providing credentials to a first user bY an ID provider, the first user being the owner of the credentials;
storing the credentials in the memory of a first ID instrument in possession of the first user; and forwarding the credentials from the first user over a communication network to a second ID instrument in the possession of a second user to thereby enable use by the second user transaction data accessible to the first ID instrument, the step of forwarding including transmitting only basic access data to the second user to allow the second user to access the transaction data from the computer.

23. A method for providing a customized set of identification data to facilitate a transaction, the method comprising the steps of:
receiving a set of personal data of a user defining user credentials to add the user to a user network;
associating a personal ID with the user credentials;
deriving a data profile from the user credentials for use by a provider to thereby provide customized data to the provider;
acquiring the personal ID of the user from an ID instrument;
identifying the user as a member of the user network responsive to the personal ID;
providing customized data to the provider;
recording the date, time and transaction location of each recognition of the personal ID associated with the user network defining logged data; and
providing the user access to that logged data.

24. A method as defined in claim 23, wherein the step of deriving the data profile from the user credentials includes associating user credentials from a plurality of ID providers with user credentials provided by a single provider.

25. A method as defined in claim 24, wherein the customized data includes indicia that the user presenting the ID instrument is a member of the user network, and wherein the method further comprises the step of manipulating a peripheral device associated with a point of transaction responsive to the indicia.

26. A method as defined in claim 24, wherein the personal ID includes a subscriber identity module ID number associated with the ID instrument.

27. A method for providing a customized set of identification data to facilitate a transaction, the method comprising the steps of:
receiving a set of personal data of a user defining user credentials to add the user to a user network;
associating a plurality of personal IDs with the user credentials;
deriving a data profile from the user credentials for use by a provider, the step of deriving including associating user credentials from a plurality of ID providers with user credentials provided by a single provider to thereby provide customized data to the provider;
acquiring the personal ID of the user from an ID instrument;
identifying in the user as a member of the user network responsive to the personal ID; and
providing customized data to the provider including providing a message associated with one of the personal IDs indicating transaction instructions to the provider.

28. A computer readable medium that is readable by a computer providing a customized set of identification data to facilitate a transaction, the computer readable medium comprising a set of instructions that, when executed by the computer, cause the computer to perform the operations of:
receiving a set of personal data from a remotely positioned user;
receiving a personal ID from the user to associate with the set of personal data;
deriving a data profile from the set of personal data of the user responsive to the personal ID and the provider ID to thereby provide customized data for use by a provider identified by a provider ID;
receiving a request for at least a portion of the set of personal data of the user along with both the personal ID of the user and the provider ID of the provider;
associating a plurality of personal IDs with the set of personal data; and
associating with one of the personal IDs a message indicating transaction instructions to the provider.

29. A computer readable medium as defined in claim 28, wherein the request for personal data is received from one of the following: a point-of-sale terminal, a point of transaction terminal, and a data processor in communication with the computer and the point-of-sale terminal or the point of transaction terminal; and
wherein the instructions further include those to perform the operation of providing customized data responsive to the data profile for use by the provider in performing at least one of the following: identifying the user, verifying the identity of the user, and supplementing additional transactional information beyond that stored on an ID instrument.

30. A computer readable medium as defined in claim 28, wherein the instructions further include those to perform the operations of:
associating and storing the personal ID received from the user and set of personal data in a database in communication with the computer; and
sending the personal ID received from the user and transaction data via the Internet or a point of transaction to load on an ID instrument.

31. A computer readable medium as defined in claim 28, wherein the personal ID received from the user is acquired from a preloaded ID instrument presented at a point-of-sale or point of transaction; and
wherein the personal ID received from the user includes a subscriber identity module ID number associated with the ID instrument.

32. A computer readable medium as defined in claim 28, wherein the instructions further include those to perform the operations of:
receiving and processing changes, updates, and additions from providers of components of data profiles; and
providing the changes, updates, and additions to the user responsive to the processing.

33. A computer readable medium that is readable by at least one processor, the computer readable medium comprising a set of instructions that, when executed by the at least one processor, individually or in unison, cause the at least one processor to perform the operations of:
providing credentials to a first user by an ID provider, the providing including providing credentials to a computer for later access b the first user and converting the data into point-of-sale or point of transaction read form prior to the accessing by the first user;
storing the credentials in memory of a first ID instrument in possession of the first user; and
forwarding the credentials from the first ID instrument to a second ID instrument in possession of a second user to thereby allow for receipt of data otherwise stored on the first ID instrument.

34. A computer readable medium as defined in claim 33, wherein the credentials can include at least one of the following: an account number, expiration date, pin number for a debit card, pin number for a credit card, pin number for a bank account, security identification number for a security badge, and biometric information.

35. A computer readable medium as defined in claim 33, wherein the first user is the owner of the credentials, and wherein the credentials are provided through a communication network to the first ID instrument in digitized, point-of-sale or point of transaction ready form.

36. A computer readable medium as defined in claim 33, wherein the first user is the owner of the credentials, and wherein the operation of forwarding includes transmitting the credentials by the first user to a computer for access by a second user.

37. A computer readable medium as defined in claim 33, wherein the first user is the owner of the credentials, and wherein the operation of forwarding includes transmitting data to the second user to allow the second user to access electronic currency associated with the first user, to thereby transfer electronic currency between the first and the second users, negating any need for actual currency transfer.

38. A computer readable medium that is readable by at least one processor, the computer readable medium comprising a set of instructions that, when executed by the at least one processor, individually or in unison, cause the at least one processor to perform the operations of:
 providing credentials to a first user by an ID provider, the first user being the owner of the credentials;
 storing the credentials in memory of a first ID instrument in possession of the first user; and
 forwarding the credentials from the first ID instrument to a second ID instrument in possession of a second user to thereby allow for receipt of data otherwise stored on the first ID instrument, the operation of forwarding including transmitting only basic access data to the second user to allow the second user to access the data from the computer.

39. A computer readable medium that is readable by a computer providing a customized set of identification data to facilitate a transaction, the computer readable medium comprising a set of instructions that, when executed by the computer, cause the computer to perform the operations of:
 receiving a set of personal data of a user defining user credentials to add the user to a user network;
 associating a personal ID with the user credentials;
 deriving a data profile from the user credentials for use by a provider to thereby provide customized data to the provider;
 receiving the personal ID of the user from an ID instrument;
 identifying the user as a member of the user network responsive to the personal ID;
 providing customized data to the provider;
 recording the date, time and transaction location of each recognition of the personal ID associated with the user network defining logged data; and
 providing the user access to that logged data.

40. A computer readable medium as defined in claim 39, wherein the operation of deriving the data profile from the user credentials includes associating user credentials from a plurality of ID providers with user credentials provided by a single provider.

41. A computer readable medium as defined in claim 39, wherein the customized data includes indicia that the user presenting the ID instrument is a member of the user network, the indicia used by a provider point of transaction terminal as a flag to determine if the user is authorized access to a peripheral device associated therewith.

* * * * *

UNITED STATES PATENT AND TRADEMARK OFFICE
CERTIFICATE OF CORRECTION

PATENT NO. : 7,357,312 B2
APPLICATION NO. : 11/394314
DATED : April 15, 2008
INVENTOR(S) : Frank J. Gangi It is certified that error appears in the above-identified patent and that said Letters Patent is hereby corrected as shown below:

Column 1, line 30, after the word "limitation" add --,--; line 47, delete the word "porated" and replace with --porate--; line 61, after the word "supermarkets" add --,--; line 62, after the word "purchase" add --,--; line 67, after the words "check outs" add --,--.

Column 2, line 4, delete the words "and or" and replace with --and/or--; line 7, delete the word "and" and replace with --with--; line 9, delete the words "Point-of sale" and replace with --point-of-sale--; line 32, delete the word "even" and replace with --event--; line 35, after the word "providing" add --additional information--; line 36, delete the words "additional information"; line 40, after the word "in" delete "co-pending"; line 52, after the word "what" delete the words "then can" and replace with --can then--; line 53, after the word "cards" add --,--, and after the word "memory" add --,--; line 55, after the word "information" add --,--; line 56, after the word "necessary," add --writing--; line 59, after the word "however" add --,--; line 67, after the word "ideal" add --.--, and delete the word "this" and replace with --This--.

Column 3, line 1, after the word "track" add --,--, and after the word "example" add --,--; line 2, after the word "character" add --,--; line 3, after the word "itself" add --,--; line 7, after the word "noted" add --,--; line 15, delete the word "that"; line 16, after the word "track" add --.--, and delete "specifically" and replace with --Specifically--; line 17, after the word "be" add --,--, and after the word "example" add --,--; line 19, delete the word "the" and replace with --a--; line 20, delete the word "designed" and replace with --design--; line 23, after the word "number" add --,--, and after the word "like" add --,--; line 24, after the word "unused" add --,--; line 25, after the word "used" add --, may be written--, and delete "is present"; line 26, after the word "codes" add --,--; line 28, after the word "therefore" add --,--; line 34, after the word "field" add --,--; line 45, after the word "from" delete the word "a" and replace with --the--; line 46, delete the word "a" and replace with --the--; line 47, delete the word "a" and replace with --the--; line 56, delete the word "a" and replace with --the--.

Column 4, line 6, delete the words "point of sale" and replace with --point-of-sale--; line 46, delete the word "processing" and replace with --processor--.

Column 5, line 51, after the word "processors" add --,--.

Column 6, line 47, after the word "instrument" add --,--; line 67, after the word "standard;" delete the word "and".

Column 7, line 39, after the word "patent" delete the word "application"; line 46, after the word "consolidator" add --,--, and after the word "above" add --,--.

UNITED STATES PATENT AND TRADEMARK OFFICE
CERTIFICATE OF CORRECTION

| | |
|---|---|
| PATENT NO. | : 7,357,312 B2 |
| APPLICATION NO. | : 11/394314 |
| DATED | : April 15, 2008 |
| INVENTOR(S) | : Frank J. Gangi |

It is certified that error appears in the above-identified patent and that said Letters Patent is hereby corrected as shown below:

Column 8, line 8, after the word "indicate" add --that--; line 8, delete the words "type of"; line 10, after the word "data" add --,--; line 15, after the word "codes" add --,--; line 17, after the word "codes" add --,--; line 30, after the word "Further" add --,--; line 45, delete the word "provides" and replace with --provide--; line 46, after the word "card" add --,--; line 48, after the word "effectively" delete the word "to"; line 49, after the word "bpi" delete the ",", and after the word "track" add --,--; line 62, delete the words "and or" and replace with --and/or--.

Column 9, line 11, after the numeral 31, delete the "." and replace with --,--, and delete "In" and replace with --in--; line 21, after the word "example" add --,--; line 47, delete the word "ticketing" and replace with --tickets--.

Column 10, line 22, after the word "person" add --,--, and after the word "and" add --with--.

Column 11, line 26, delete the words "point of sale" and replace with --point-of-sale--; line 28, after the word "previously" add --,--; line 57, after the word "devices," add --and--.

Column 13, line 44, after numeral "47" add --,--; line 45, after the word "store" add --,--; line 55, after the word "currency" add --,--.

Column 14, line 2, delete the word "transmitting" and replace with --transmitted--; line 42, after the word "encrypted" add --,--; line 43, after the word "art" add --,--; line 48, delete the word "also", and after the word "can" add the word --also--.

Column 15, line 7, after the word "thereon" add --,--; line 45, after numeral "43" add --,--.

Column 18, line 13, after the word "card" add --of--.

Column 19, line 25, after the word "form" add --a--; line 30, after numeral "39" add --,--, line 55, after the year "2005," add --now U.S. Patent No. 7,083,087--.

Column 20, line 26 (claim 1, line 7), after the word "person" add --,--; line 27 (claim 1, line 8), after the word "from" delete "a" and replace with --the--; line 28 (claim 1, line 9), after the word "with" delete "a" and replace with --the--, and after the word "identifying" delete "a" and replace with --the--.

Column 21, line 32 (claim 3, line 24), after the word "data" delete the ",".

UNITED STATES PATENT AND TRADEMARK OFFICE
CERTIFICATE OF CORRECTION

PATENT NO. : 7,357,312 B2
APPLICATION NO. : 11/394314
DATED : April 15, 2008
INVENTOR(S) : Frank J. Gangi It is certified that error appears in the above-identified patent and that said Letters Patent is hereby corrected as shown below:

Column 22, line 11 (claim 7, line 11), after the word "and" add --the--.

Column 23, line 34 (claim 12, line 15), after the word "data" delete the ","; line 39 (claim 13, line 3), after the word "selected" add --different--; line 52 (claim 13, line 16), after the word "selected" add --different--; line 57 (claim 14, line 4), delete the word "form" and replace with --from--; line 63 (claim 14, line 10), delete the word "begin" and replace with --being--; line 66 (claim 14, line 13), after the word "receiving" delete "the" and replace with --a--.

Column 24, line 63 (claim 22, line 3), after "ing" add --the steps of--; line 64 (claim 22, line 4), delete "bY" and replace with --by--.

Column 25, line 3 (claim 22, line 10), after the word "enable" add --for--; line 52 (claim 27, line 13), after the word "acquiring" delete "the" and replace with --a--; line 54 (claim 27, line 15), after the word "identifying" delete the word "in".

Column 26, line 55 (claim 33, line 8), after the word "access" delete the letter "b" and replace with --by--; line 53 (claim 33, line 6), after the word "the" add --operation of--; line 56 (claim 33, line 9) delete the word "read" and replace with --ready--.

Signed and Sealed this

Twenty-fifth Day of November, 2008

JON W. DUDAS
*Director of the United States Patent and Trademark Office*